United States Patent
Rachevsky et al.

(10) Patent No.: US 9,524,289 B2
(45) Date of Patent: Dec. 20, 2016

(54) AUTOMATED TEXT ANNOTATION FOR CONSTRUCTION OF NATURAL LANGUAGE UNDERSTANDING GRAMMARS

(71) Applicant: Nuance Communications, Inc., Burlington, MA (US)

(72) Inventors: Leonid Rachevsky, Ossining, NY (US); Raimo Bakis, Briarcliff Manor, NY (US); Bhuvana Ramabhadran, Mount Kisco, NY (US)

(73) Assignee: Nuance Communications, Inc., Burlington, MA (US)

( * ) Notice: Subject to any disclaimer, the term of this patent is extended or adjusted under 35 U.S.C. 154(b) by 110 days.

(21) Appl. No.: 14/188,206

(22) Filed: Feb. 24, 2014

(65) Prior Publication Data

US 2015/0242387 A1     Aug. 27, 2015

(51) Int. Cl.
*G06F 17/27* (2006.01)
*G10L 15/06* (2013.01)
*G10L 15/187* (2013.01)
*G06F 17/30* (2006.01)

(52) U.S. Cl.
CPC ......... *G06F 17/274* (2013.01); *G06F 17/2785* (2013.01); *G06F 17/30731* (2013.01); *G10L 15/06* (2013.01); *G10L 15/187* (2013.01); *G06F 17/30734* (2013.01); *G10L 15/063* (2013.01); *G10L 2015/0635* (2013.01)

(58) Field of Classification Search
CPC ............ G06F 17/30731; G06F 17/30734; G06F 17/30737; G10L 15/06; G10L 15/063; G10L 2015/0631; G10L 2015/0633;G10L 2015/0635; G10L 2015/0636; G10L 2015/0638
See application file for complete search history.

(56) References Cited

U.S. PATENT DOCUMENTS

| | | | |
|---|---|---|---|
| 6,675,159 B1* | 1/2004 | Lin et al. | |
| 7,610,192 B1* | 10/2009 | Jamieson | G06Q 50/22 704/1 |
| 7,986,842 B2* | 7/2011 | Cooper | G06K 9/6297 382/173 |

(Continued)

FOREIGN PATENT DOCUMENTS

WO     2005/048240 A1     5/2005

OTHER PUBLICATIONS

Jun. 8, 2015—(PCT) International Search Report and Written Opinion—App PCT/US2015/017123.

(Continued)

*Primary Examiner* — Richard Zhu
(74) *Attorney, Agent, or Firm* — Banner & Witcoff, Ltd.

(57) ABSTRACT

Aspects described herein provide various approaches to annotating text samples in order to construct natural language grammars. A text sample may be selected for annotation. A set of annotation candidates may be generated based on the text sample. A classifier may be used to score the set of annotation candidates in order to obtain a set of annotation scores. One of the annotation candidates may be selected as a suggested annotation for the text sample based on the set of annotation scores. A grammar rule may be derived based on the suggested annotation, and a grammar may be configured to include the annotation-derived grammar rule.

15 Claims, 13 Drawing Sheets

(56) References Cited

U.S. PATENT DOCUMENTS

| | | | |
|---|---|---|---|
| 8,244,730 B2* | 8/2012 | Gupta | 707/737 |
| 8,316,039 B2* | 11/2012 | Vanderwende et al. | 707/759 |
| 8,359,282 B2* | 1/2013 | Bai et al. | 706/12 |
| 8,396,286 B1 | 3/2013 | Aradhye et al. | |
| 2005/0043936 A1* | 2/2005 | Corston-Oliver et al. | 704/4 |
| 2005/0105712 A1* | 5/2005 | Williams | G10L 13/027 379/265.02 |
| 2007/0174041 A1* | 7/2007 | Yeske | 704/3 |
| 2008/0059149 A1* | 3/2008 | Martin | 704/9 |
| 2008/0154578 A1* | 6/2008 | Xu et al. | 704/4 |
| 2009/0012842 A1* | 1/2009 | Srinivasan et al. | 705/10 |
| 2009/0083010 A1* | 3/2009 | Qi | G06K 9/00711 703/2 |
| 2009/0089047 A1 | 4/2009 | Pell et al. | |
| 2010/0063799 A1* | 3/2010 | Jamieson | 704/9 |
| 2010/0306214 A1* | 12/2010 | Paparizos et al. | 707/759 |
| 2011/0320186 A1* | 12/2011 | Butters | G06F 17/30672 704/9 |
| 2012/0271627 A1* | 10/2012 | Danielyan et al. | 704/9 |
| 2014/0201185 A1* | 7/2014 | Chang et al. | 707/709 |

OTHER PUBLICATIONS

"Detecting Levels of Interest from Spoken Dialog with Multistream Prediction Feedback and Similarity Based Hierarchical Fusion Learning," William Yang Wang et al., SIGDIAL 2011: 12th Annual Meeting of the Special Interest Group on Discourse and Dialogue, pp. 152-161, Portland, OR, Jun. 17-18, 2011.

NuGram IDE Reference Guide, "VoiceObjects 1.1", Voxeo Germany GmbH, Doc. No. E-038-20111215-VO11, 2011.

"Using MDL for Grammar Induction," Pieter Adriaans et al., ICT innovation program of the Ministry of Economic Affairs, Amsterdam, Netherlands, 2004.

"The Unsupervised Learning of Natural Language Structure," Dan Klein, Department of Computer Science at Stanford University, Mar. 2005.

"Incorporating Non-Local Information into Information Extraction Systems by Gibbs Sampling," Jenny Rose Finkel et al., Computer Science Department, Stanford University, 2005.

"Unsupervised Learning and Grammar Induction," Alex Clark et al., Blackwell Computational Linguistics and Natural Language Processing Handbook, Apr. 1, 2009.

"Rapid Development of Spoken Language Understanding Grammars," Ye-Yi Wang et al., Microsoft Research Speech Communication, vol. 48, No. 3-4, pp. 390-416, 2006.

* cited by examiner

AUTOMATED TEXT ANNOTATION FOR CONSTRUCTION OF NATURAL LANGUAGE UNDERSTANDING GRAMMARS

BACKGROUND

Building speech recognition applications can be a time consuming process. Development of natural language understanding (NLU) grammars, in particular, can be one of the most challenging aspects of developing speech applications. Such development may involve the use of special linguistic and software development skills.

Various approaches to speed up the grammar development process have been attempted. Some conventional approaches may utilize unsupervised grammar induction techniques, integrated development environments (IDEs) for authoring grammars, or graphical user interface, i.e., GUI-based interactive tools as alternatives to manual grammar creation.

Unsupervised grammar induction techniques, however, do not provide meaningful grammar rules that are readable to humans and also require further manual tuning. Although IDEs may be useful in testing grammars, debugging grammars, and visualizing parsing results, such IDEs do not provide suggestions regarding the target grammar structure, grammar rules, or the ordering of such rules. Instead IDEs delegate these tasks to the user. While GUI-based interactive tools may be helpful in guiding a user through an annotation process, such tools use complicated statistical and lexicalization models (e.g., hidden Markov models and context-free grammars). As a result, such GUI-based tools require significant amounts of effort to properly define slot fillers based on regular expressions.

Therefore a need exists for improved approaches to constructing natural language understanding grammars.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect provided herein describes a computer-implemented method of constructing a grammar. A digital text sample may be selected for annotation. An annotation module may automatically generate a set of annotation candidates based on the text sample. A classifier of a classifier module may automatically score the set of annotation candidates in order to obtain a set of annotation scores. The annotation module may select one of the annotation candidates as a suggested annotation for the text sample based on the set of annotation scores. A grammar construction module may automatically derive a grammar rule based on the suggested annotation and configure a digital grammar to include the annotation-derived grammar rule.

A second aspect provided herein describes a grammar construction system. The grammar construction system may include at least one processor, a display device, and one or more input devices. An annotation module of the grammar construction system may be configured to, in operation, automatically annotate a text sample and obtain an annotation candidate for the text sample. The annotation candidate may be one of a set of annotation candidates for the text sample. The annotation module may obtain the annotation candidate by replacing an n-gram of the text sample with a hypernym corresponding to the n-gram. A classifier module of the grammar construction system may include a classifier and be configured to, in operation, classify the set of annotation candidates using the classifier. A grammar construction module of the grammar construction system may be configured to, in operation, derive a grammar rule based on one of the annotation candidates selected as an annotation for the text sample and derive a grammar rule based on a corpus of the classifier. The grammar construction module may also be configured to, in operation, configure a grammar to include the annotation-derived and the classifier-derived grammar rules.

Generating the set of annotation candidates may include locating a hypernym associated with an n-gram of the text sample and creating a new annotation candidate based on the text sample and the hypernym. The hypernym may replace the n-gram in the new annotation candidate. The hypernym may be located by querying a collection of semantic relationship definitions. If the collection of semantic relationship definitions defines a semantic relationship between the n-gram and a concept, then the concept may be selected as the hypernym for the n gram. The collection of semantic relationship definitions may be a concept mapping comprised of one or more key-value pairs, an ontology, or a linguistic resource that is accessible via a network. If a concept corresponding to the n-gram cannot be located automatically, then a user may be prompted to manually select a concept associated with the n-gram, and the manually-selected concept may be selected as the hypernym for the n-gram. A user may provide user input corresponding to a manually-selected concept via one or more input devices of the grammar construction system.

The classifier may be automatically trained using a set of confirmed annotations. Training the classifier may include extracting a feature from a confirmed annotation and updating a corpus of the classifier using the feature. The feature may include at least one hypernym of the confirmed annotation and at least one word adjacent to the hypernym in the confirmed annotation. The classifier may be a term frequency-inverse document frequency (TF-IDF) classifier or a naïve Bayes (NB) classifier. The classifier module may also include a feature extractor configured to, in operation, extract features from an annotation candidate or a confirmed annotation as well as update the corpus of the classifier using an extracted feature.

A TF-IDF classifier may extract a feature from a confirmed annotation candidate by scanning the confirmed annotation candidate with a window. When a substring of the confirmed annotation that includes a hypernym appears within the window, an n-gram of the substring may be selected as a feature of the confirmed annotation. A feature vector may be obtained for the feature, and the feature vector may be added to the corpus of the TF-IDF classifier in order to update the corpus. The TF-IDF classifier may be used to score a set of annotation candidates for a text sample by selecting one of the annotation candidates, extracting a set of features from the annotation candidate, and obtaining a set of feature vectors based on the set of features. The TF-IDF classifier may then score each feature vector in the set of feature vectors to obtain a set of feature scores. The feature scores may then be summed to obtain an annotation score for the annotation candidate.

An NB classifier may extract a feature from a confirmed annotation by extracting hypernyms from the confirmed annotation candidate and concatenating the hypernyms to obtain one or more concatenated hypernyms. A sequence that includes one or more of the hypernyms and/or the concatenated hypernyms may be obtained. A substring of the confirmed annotation that corresponds to the sequence may be selected as the feature. The feature may be added to the corpus of the NB classifier in order to update the corpus. The NB classifier may be used to score a set of annotation candidates for a text sample by selecting one of the annotation candidates, extracting hypernyms from the annotation candidate, obtaining a set of concatenated hypernyms, a set of sequences, and a set of features for the annotation candidate. Hypernym probabilities for the hypernyms and concatenated hypernyms may be computed. A hypernym probability may be based on a feature probability computed by the NB classifier for a feature of the hypernym or concatenated hypernym. Sequence probabilities for each sequence of set of sequences may be computed. A sequence probability may be the product of one or more hypernym probabilities computed for the hypernyms and/or concatenated hypernyms of the sequence. An annotation probability may be computed as the annotation score for the annotation candidate. The annotation probability may be the sum of the sequence probabilities for the set of sequences obtained for the annotation candidate.

The annotation module may further be configured to, in operation, present one of the annotation candidates at the display device as a suggested annotation candidate. The annotation module may prompt a user to confirm or reject the suggested annotation candidate. Upon confirmation of the suggested annotation candidate, the annotation module may select the suggested annotation candidate as the annotation for a text sample. Upon rejection of the suggested annotation candidate, the annotation module may prompt the user to manually select one of the annotation candidates and select the manually-selected annotation candidate as the annotation for the text sample.

The annotation candidate selected as the annotation for a text sample may be the annotation candidate having the highest annotation score. The grammar construction module may also be configured to, in operation, sort the rules of a grammar based on weighting values provided by the classifier of the classifier module.

Additional aspects will be appreciated with the benefit of the additional description provided in further detail below.

BRIEF DESCRIPTION OF THE DRAWINGS

The details of these and other embodiments of the disclosure are set forth in the accompanying drawings and description below. Other features and advantages of aspects of the disclosure will be apparent from the description and drawings.

DETAILED DESCRIPTION

Figure 1:
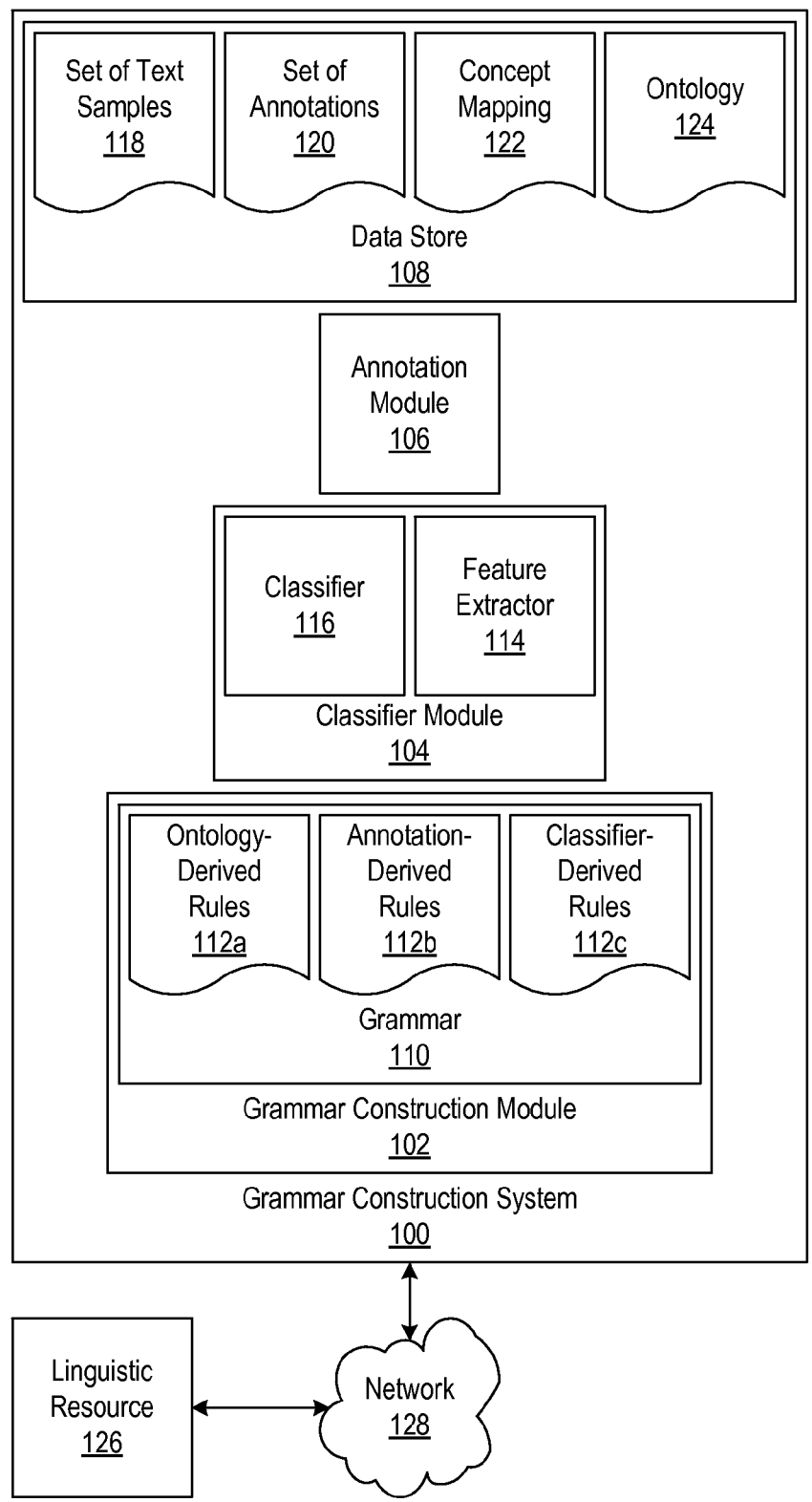
FIG. 1 is an example of an implementation of a grammar construction system according to illustrative aspects described herein.

Aspects of the present disclosure are directed towards automated text annotation for construction of natural language understanding grammars. Aspects of the present disclosure may be implemented to create grammar rules that are based on semantic definitions of an ontology, annotations of text samples, and a trained classifier. The trained classifier may be trained using the annotations of the text samples, and grammars constructed using the disclosed techniques may successfully parse text samples for which no corresponding annotation appeared in the training data. These techniques may also speed up the annotation process by automatically suggesting the most probable annotation for a text sample. These and other aspects will be appreciated with the benefit of the additional disclosures set forth in further detail below.

As aspects of the present disclosure are directed toward natural language understanding, the following terminology is adopted in the present disclosure for the purposes of convenience. A text sample refers to a string of one or more words. A substring refers to one or more consecutive words of a string in which the order of the words is preserved. One or more words of a text sample may be hyponyms (relatively low-level concepts) that correspond to or are otherwise associated with one or more hypernyms (relatively high-level concepts). An ontology may define a semantic relationship between hyponyms and hypernyms. A hyponym may be a single word of a text sample or multiple consecutive words of a text sample. It will be appreciated that a hypernym may, in some instances, be a hyponym of another hypernym. As an example, "Chicago" may be a hyponym of the hypernym "CITY," which may in turn be a hyponym of the hypernym "LOCATION." Additional examples will be appreciated with the benefit of this disclosure. A simple hypernym refers to a single hypernym, and a complex hypernym refers to a concatenation of at least two simple hypernyms. A complex hypernym may include a delimiter (e.g., "&") that separates the concatenated simple hypernyms. A complex hypernym may thus also be referred to as a concatenated hypernym.

An annotation refers to a text sample in which an n-gram has been replaced by a hypernym associated with the n-gram. An annotation may include multiple hypernyms that have respectively replaced multiple n-grams. An n-gram refers to a substring of text sample or an annotation having n consecutive words (for a text sample) or n consecutive words and/or hypernyms (for an annotation). Accordingly, a 1-gram may refer to a substring of text sample having one word of the text sample, or may refer to a substring of an annotation having one word or hypernym of the annotation. Likewise a 2-gram may refer to a substring of a text sample having two consecutive words of the text sample or may refer to a substring of an annotation having two consecutive words, two consecutive hypernyms, or a consecutive word and hypernym of the annotation. Additional examples will be appreciated for 3-grams, 4-grams, and so forth. A feature refers to an n-gram of an annotation that includes at least one hypernym and at least one word of the text sample or annotation that is adjacent to one of the hypernyms.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a set refers to a collection of one or more elements. Furthermore computer-readable media as used in this disclosure includes all non-transitory computer-readable media and excludes transitory computer readable media such as propagating signals.

Referring now to FIG. 1, an example of an implementation of a grammar construction system 100 is shown. The grammar construction system 100, in this example, includes a grammar construction module 102, a classifier module 104, an annotation module 106, and a data store 108. As described in further detail below, the grammar construction module 102 may be used to construct a grammar 110 having various grammar rules 112a-c. The rules of the grammar 110 may include ontology-derived rules 112a, annotation-derived rules 112b, and classifier-derived rules 112c. The classifier module, in this example, includes a feature extractor 114 and a classifier 116. The data store 108, in this example, may store a set of text samples 118, a set of annotations 120, an internal concept mapping 122, and an ontology 124. As the methods described herein are computer-based methods for automating aspects of the grammar development process, the set of text samples 118, set of annotations 120, concept mapping 122, ontology 124, and grammar 110 may be stored at a data store in a digital format. In other words, the text samples in the set of text samples 118 are digital text samples, and the grammar 110 is a digital grammar.

The grammar construction system 100 may also be in signal communication with an external linguistic resource 126 via a network 128 (e.g., the Internet). The network 128 is a communications network and may include one or more wired networks, wireless networks, or combinations of wired and wireless networks. Accordingly, the network 128 may include a local area network (LAN), a wide area network (WAN) such as the Internet, a cellular network, a public switched telephone network (PSTN), and other types of networks known to those skilled in the art.

The annotation module 106 may be configured to, in operation, annotate text samples and generate annotations for the text samples. The annotation module 106 may be configured to annotate text samples in an automatic fashion or, additionally or alternatively, in response to input received from a user, i.e., in a manual fashion. The annotation module 106 may be configured to generate a set of annotation candidates corresponding to possible annotations for a text sample. The set of annotation candidates may include one or more annotation candidates and may be referred to as a list of annotation candidates. The annotation module 106 may then select one of the annotation candidates as the annotation for the text sample. Selection of an annotation candidate as the annotation for a text sample may be automatically performed by the annotation module 106 or may be performed in response to input received at the grammar construction system 100 from a user. The annotation module 106 may, for example, be configured to present the list of annotation candidates to a user (e.g., in a contextual menu) and allow the user to select one of the annotation candidates as the annotation for the text sample.

Figure 2:
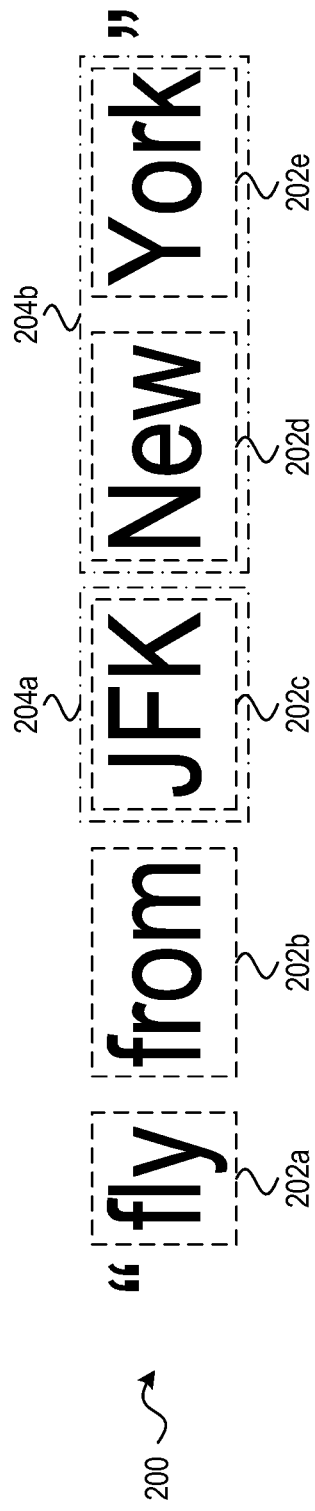
FIG. 2 is an illustration of an example text sample according to illustrative aspects described herein.
Figure 3:
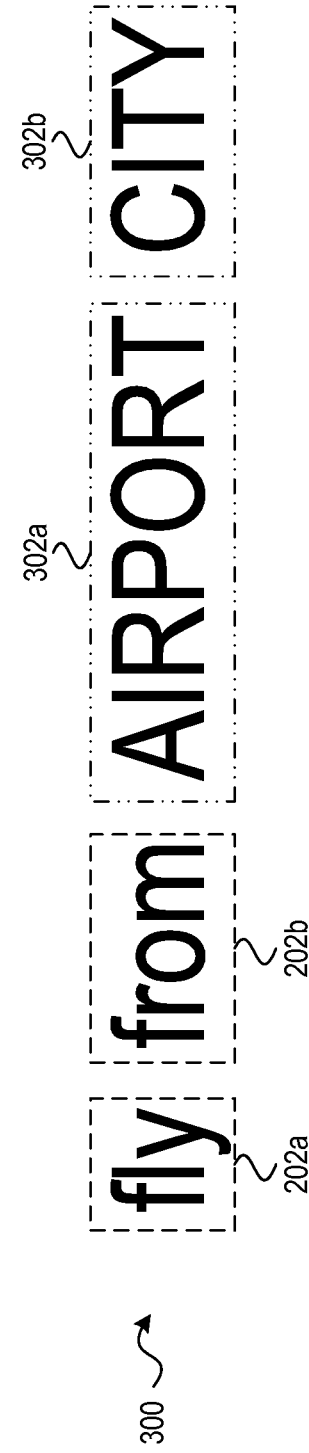
FIG. 3 is an illustration of an example annotation for the example text sample of FIG. 2 according to illustrative aspects described herein.

Referring briefly to FIG. 2, an illustration of an example text sample 200 is shown ("fly from JFK New York"). As noted above, the text sample 200 includes multiple individual words 202a-e. Individual words of the text sample 200 may thus correspond to respective 1-grams of the text sample. As seen in FIG. 2, some of the words such as word 202c ("JFK") and words 202d-e ("New York") correspond to hyponyms 204a and 204b respectively. As noted above, a hyponym such as hyponym 204b may comprise multiple words. The hyponym 204b in FIG. 2 consists of two words and thus corresponds to a 2-gram of the text sample 200. The words 202c and 202d-e represent respective hyponyms 204a-b in this example because these words may correspond to respective hypernyms, e.g., "AIRPORT" for "JFK" and "CITY" for "New York." In FIG. 3 an illustration of an example annotation 300 of the text sample 200 of FIG. 2 is shown. As seen in the example annotation 300 of FIG. 3, the hyponyms 204a and 204b of the text sample 200 have been replaced with their corresponding hypernyms 302a and 302b. It will be appreciated that the annotation 300 illustrated in FIG. 3 is but one example of a possible annotation for the text sample 200 of FIG. 2. As noted above and described further below, the annotation module 106 may generate a list of annotation candidates for a text sample.

Referring back to FIG. 1, the annotation module 106 may annotate multiple text samples from the set of text samples 118 during construction of a grammar such as grammar 110.

Through the annotation of the set of text samples 118, the annotation module 106 may generate the set of annotations 120. The annotation module 106 may utilize the internal concept mapping 122, the ontology 124, and the external linguistic resource 126 to annotate the text samples. The internal concept mapping 122, the ontology 124, and the external linguistic resource 126 may each be generally described as a collection of semantic relationship definitions that define semantic relationships between concepts. In some example implementations, the annotation module 106 may present at a display device information from the internal concept mapping 122, ontology 124, and external linguistic resource 126. Based on the information presented at the display, a user may select a desired concept for as the hypernym of an n-gram of a text sample during manual annotation of a text sample.

The internal concept mapping 122 may be a mapping of key-value pairs that maps hyponyms to hypernyms. As an example, the internal concept mapping 122 may map the names of cities (hyponyms) to the concept "CITY" (a hypernym). In this example, the name of the city may correspond to the key of the mapping, and the concept of "CITY" may correspond to the value of the mapping, (e.g., "New York"→"CITY"). The internal concept mapping 122 may include functionality to search for a key-value pair, add a new key-value pair, and to perform other types of actions associated with mappings that will be appreciated to those skilled in the art. Accordingly, the annotation module 106 may query or perform a lookup of the internal concept mapping 122 using an n-gram of a text sample when annotating the text sample and receive a corresponding concept in response. The concept received may thus be selected as the hypernym for the n-gram.

Figure 4:
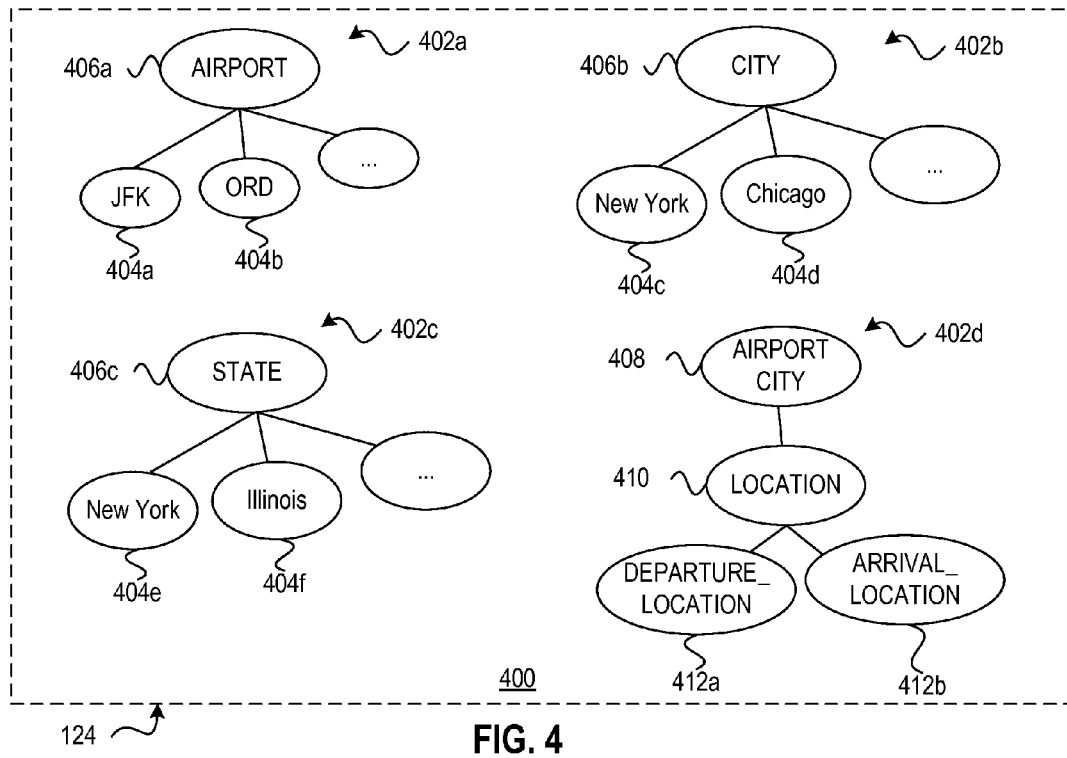
FIG. 4 is an illustration of a portion of an example ontology according to illustrative aspects described herein.

The ontology 124 may define semantic relationships between concepts. The semantic relationships defined by the ontology may indicate that some concepts are hyponyms of other concepts and that some concepts are hypernyms of other concepts. With additional reference to FIG. 4, an illustration of a portion 400 of the ontology 124 is shown. In FIG. 4, the portion 400 of the ontology 124 is depicted as a graph that defines multiple semantic relationships 402a-d between relatively low-level concepts 404a-f and relatively high-level concepts 406a-c. Accordingly the concepts 404a-d may be hyponyms of the concepts 406a-c. Likewise the concepts 406a-c may be hypernyms of the concepts 404a-d. The portion 400 of the ontology 124, in this example, defines a semantic relationship 402a between the concepts 404a-b for airport abbreviations and the "AIRPORT" concept 406a; defines a semantic relationship 402b between the concepts 404c-d for city names and the "CITY" concept 406b; and defines a semantic relationship 402c between the concepts 404e-f for state names and the "STATE" concept 406c.

As noted above, some concepts may be both hypernyms and hyponyms. The portion 400 of the example ontology 124 in FIG. 4, for example, defines a semantic relationship 402d to illustrate this semantic possibility. In particular the relationship 402d indicates that the "DEPARTURE_LOCATION" concept 412a and the "ARRIVAL_LOCATION" concept 412b are respective hyponyms of the "LOCATION" concept 410, which is in turn a hyponym of the "AIRPORT CITY" concept 408.

The annotation module 106 may query or perform a lookup of the ontology 124 during the annotation process to identify one or more concepts that correspond to or are otherwise associated with an n-gram of a text sample. The annotation module 106 may likewise query or perform a lookup of the ontology 124 to identify one or more hypernyms of an annotation that are hyponyms of other concepts as defined by the ontology 124.

The external linguistic resource 126 may be a database that, like the ontology 124, defines semantic relationships between concepts. The external linguistic resource 126 may thus be a lexical database such as, e.g., WordNet. Other examples of external linguistic resources include dictionaries capable of providing lexicographic data such as, e.g., Wikitionary. The grammar construction system 100 may submit requests to the external linguistic resource 126, e.g., HyperText Transfer Protocol (HTTP) requests, and receive results in a response, e.g., an HTTP response.

The annotation module 106 may generate a list of annotation candidates based on the hypernyms associated with the n-grams of a text sample. The annotation module 106 may determine the hypernyms that are associated with or otherwise correspond to the n-grams of a text sample based, at least in part, on the internal concept mapping 122, the ontology 124, the external linguistic resource 126, or a combination of these resources.

Figure 5:
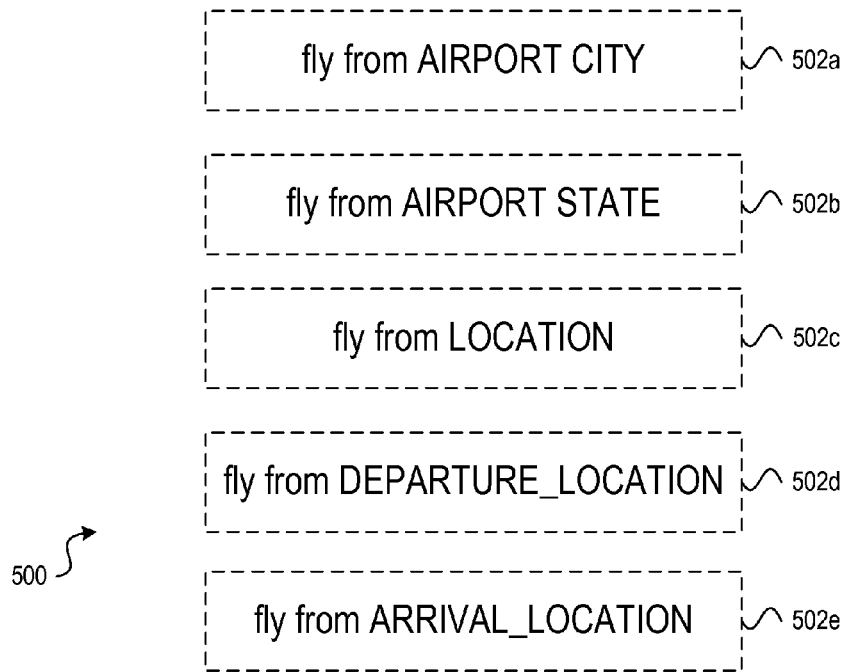
FIG. 5 is an illustration of a list of annotation candidates for the example text sample of FIG. 2 according to illustrative aspects described herein.

In FIG. 5 an illustration of an example list 500 of annotation candidates 502a-e is shown. An annotation module may generate this example list 500 by annotating the example text sample 200 of FIG. 2 based on the relationships 402a-d defined by the example ontology 124. The annotation module 106 may generate the annotation candidate 502a ("fly from AIRPORT CITY") by replacing "JFK" with "AIRPORT" and "New York" with "CITY" based on the relationships 402a and 402b of the example ontology 124. The annotation module 106 may generate the annotation candidate 502b ("fly from AIRPORT STATE") by replacing "JFK" with "AIRPORT" and "New York" with "STATE" based on the relationships 402a and 402c of the example ontology 124.

As noted above, the annotation module 106 may also be configured to evaluate the annotation candidates to determine whether an ontology defines semantic relationships for hypernyms that appear consecutively in the annotation candidates. The annotation candidate 502a, for example, includes the consecutive hypernyms of "AIRPORT" and "CITY." As seen in FIG. 4, the portion 400 of the example ontology 124 defines a relationship 402d that includes the "AIRPORT CITY" concept 408, which is a hypernym of the "LOCATION" concept 410. Accordingly, the annotation module 106 may generate the additional annotation candidate 502c ("fly from LOCATION") by replacing "AIRPORT CITY" with "LOCATION" based on the relationship 402d of the ontology 124. As noted above, the ontology 124 also indicates that the "DEPARTURE_LOCATION" concept 412a and the "ARRIVAL_LOCATION" concept 412b are respective hyponyms of the "LOCATION" concept 410. The annotation module 106 may thus obtain annotation candidate 502d ("fly from DEPARTURE_LOCATION") as well as annotation candidate 502e ("fly from ARRIVAL_LOCATION") by respectively replacing "LOCATION" with "DEPARTURE_LOCATION" and "ARRIVAL_LOCATION" based on the relationship 402d of the ontology 124.

The annotation process will be described in further detail below with reference to FIG. 7. It will also be appreciated that the portion 400 of the ontology 124 as well as the list 500 of annotation candidates 502a-e are described by way of example only. Other ontologies that define additional or alternative semantic relationships may be selectively employed, e.g., based on the subject matter of the grammar under construction. The list of annotation candidates generated by an annotation module may thus also depend on the particular ontology employed.

Referring back to FIG. 1, the classifier module 104 may be configured to, in operation, classify annotation candidates for a text sample. Classification of annotation candidates may include scoring the annotation candidates. The classifier module 104 may determine a score for each of the annotation candidates in a list of annotation candidates for a text sample. The annotation module 106 may thus, in turn, select one of the annotation candidates as the annotation for the text sample based on their respective scores. In some example implementations, the score for an annotation candidate may be employed as a weight for the annotation candidate.

In order to determine a score for an annotation candidate, the classifier module 104 may extract features from the annotation candidate using the feature extractor 114 and individually classify the annotation candidate based on those features using the classifier 116. Various types of classifiers may be selectively employed. The classifier 116, for example, may be similar to a term frequency-inverse document frequency (TF-IDF) classifier or a naïve Bayes (NB) classifier. When the classifier is a TF-IDF classifier, the classifier module may be referred to as a TF-IDF classifier module and the score may be referred to as a TF-IDF score. Similarly, when the classifier is an NB classifier, the classifier module may be referred to as an NB classifier module and the score may be referred to as a probability score. As described in further detail below, the classifier may be trained using various text samples as training data and subsequently utilized to assist when annotating additional text samples. As also described in further detail below, the classifier module 104 may be utilized when constructing the grammar 110.

The grammar construction module 102 may be configured to, in operation, construct an NLU grammar 110 for speech recognition applications. The grammar construction module 102 may derive grammar rules 112a from the ontology 124, may derive grammar rules 112b from the set of annotations 120, and may derive grammar rules 112c from the trained classifier 116 of the classifier module 104. Deriving rules to construct the grammar will be discussed in further detail below. The grammar 110 constructed by the grammar construction module 102 may thus be subsequently employed in speech recognition applications. It will thus be appreciated that the grammar 110 may be a lexical grammar that defines syntax rules for various tokens. The tokens may correspond to the hyponyms and hypernyms described above. The grammar 110 will be discussed in further detail below.

Figure 6:
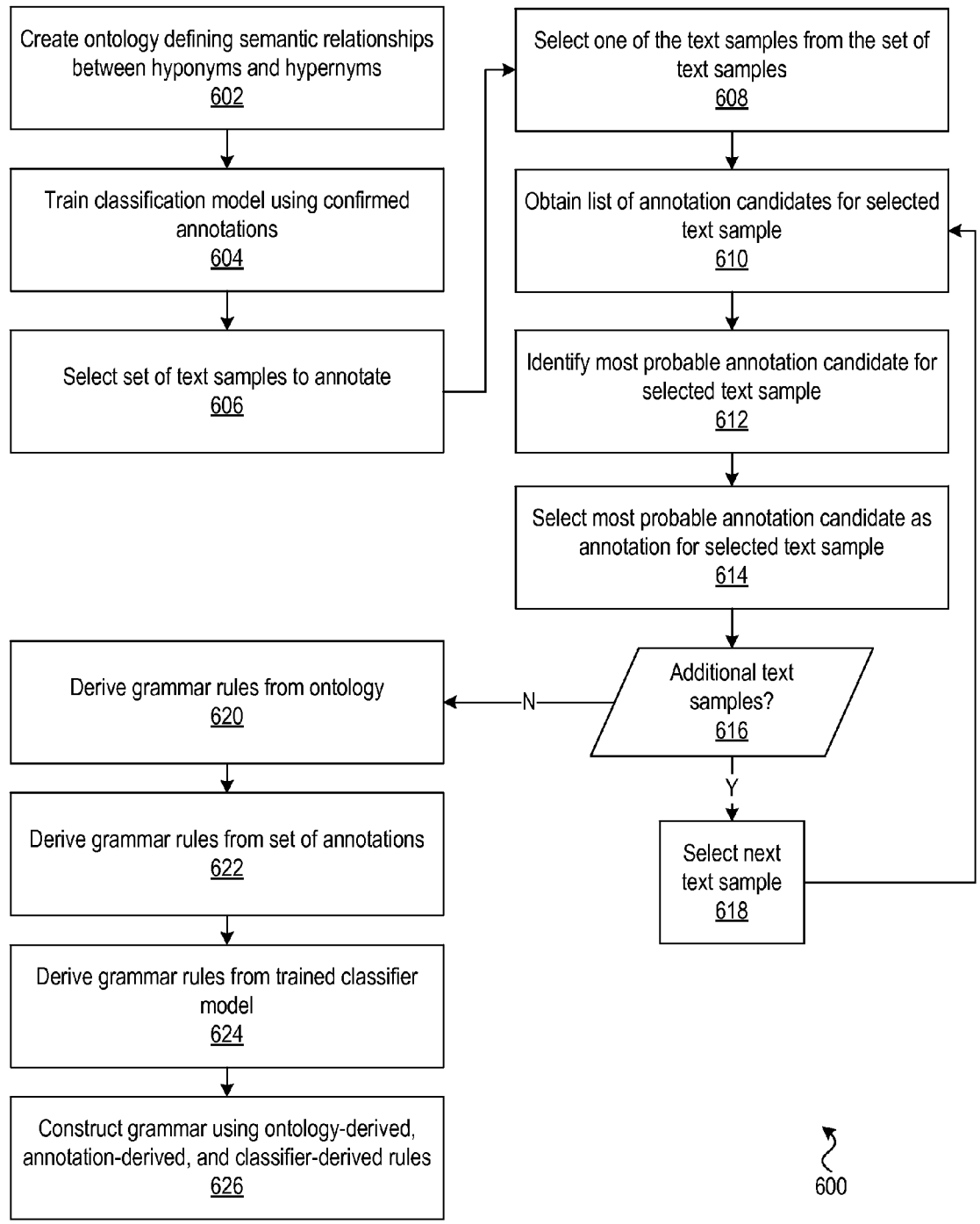
FIG. 6 is a flowchart of an example method steps for constructing a natural language understanding grammar according to illustrative aspects described herein.

Referring now to FIG. 6, a flowchart 600 of example method steps for constructing an NLU grammar is shown. The steps illustrated in FIG. 6 represent a general overview of the process of constructing an NLU grammar using a grammar construction system in accordance with aspects of the disclosure. Accordingly the steps of FIG. 6 are also described with reference to the example grammar construction system 100 of FIG. 1. Various steps shown in FIG. 6 are described in further detail below with reference to FIGS. 7-13.

As seen in FIG. 6, a user may begin the grammar construction process by creating an ontology that defines semantic relationships between concepts (block 602). The ontology may be similar to the example ontology 124 described above. It will be appreciated, however, that additional and alternative ontologies may be selectively employed depending on the subject matter of the NLU grammar under construction.

In order to assist in the grammar construction process, a classifier module may be employed. The classifier module may include a trainable classifier as described above. Accordingly the classifier of the classifier module may then be trained using confirmed annotations (block 604). A confirmed annotation refers an annotation for a text sample that has been deemed to be accurate, e.g., by a user. The confirmed annotations may thus correspond to a set of training data for the classifier. Having trained the classifier, a set of text samples may be selected for annotation (block 606). The annotation module may select one of the text samples from the set of text samples (block 608) and obtain a list of annotation candidates for the selected text sample (block 610).

The most probable annotation candidate for the selected text sample may be identified (block 612), and the most probable annotation candidate may be selected as the annotation for the selected text sample (block 614). The annotation module may utilize the classifier module to identify the most probable annotation candidate for the selected text sample. The most probable annotation candidate may, for example, be the annotation candidate in the list of annotation candidates having the highest score determined by the classifier module. To construct an NLU grammar, multiple text samples may be annotated. If there are additional text samples to annotate (block 616: Y), then the annotation module may select the next text sample (block 618) and repeat steps 610-614 for the next text sample.

Through the annotation process, the annotation module may generate a set of annotations. If there are no additional text samples to annotate (block 616: N), then a grammar construction module may initiate construction of a grammar. To construct the grammar, the grammar construction module may derive grammar rules from the ontology (block 620), may derive grammar rules from the set of annotations (block 622), and may derive grammar rules from the trained classifier (block 624). The grammar construction module may thus construct the grammar using the ontology-derived, annotation-derived, and classifier-derived rules (block 626). Stated differently, the grammar construction module may configure the grammar such that the ontology-derived, annotation-derived, and classifier-derived rules are included in the grammar.

Figure 7:
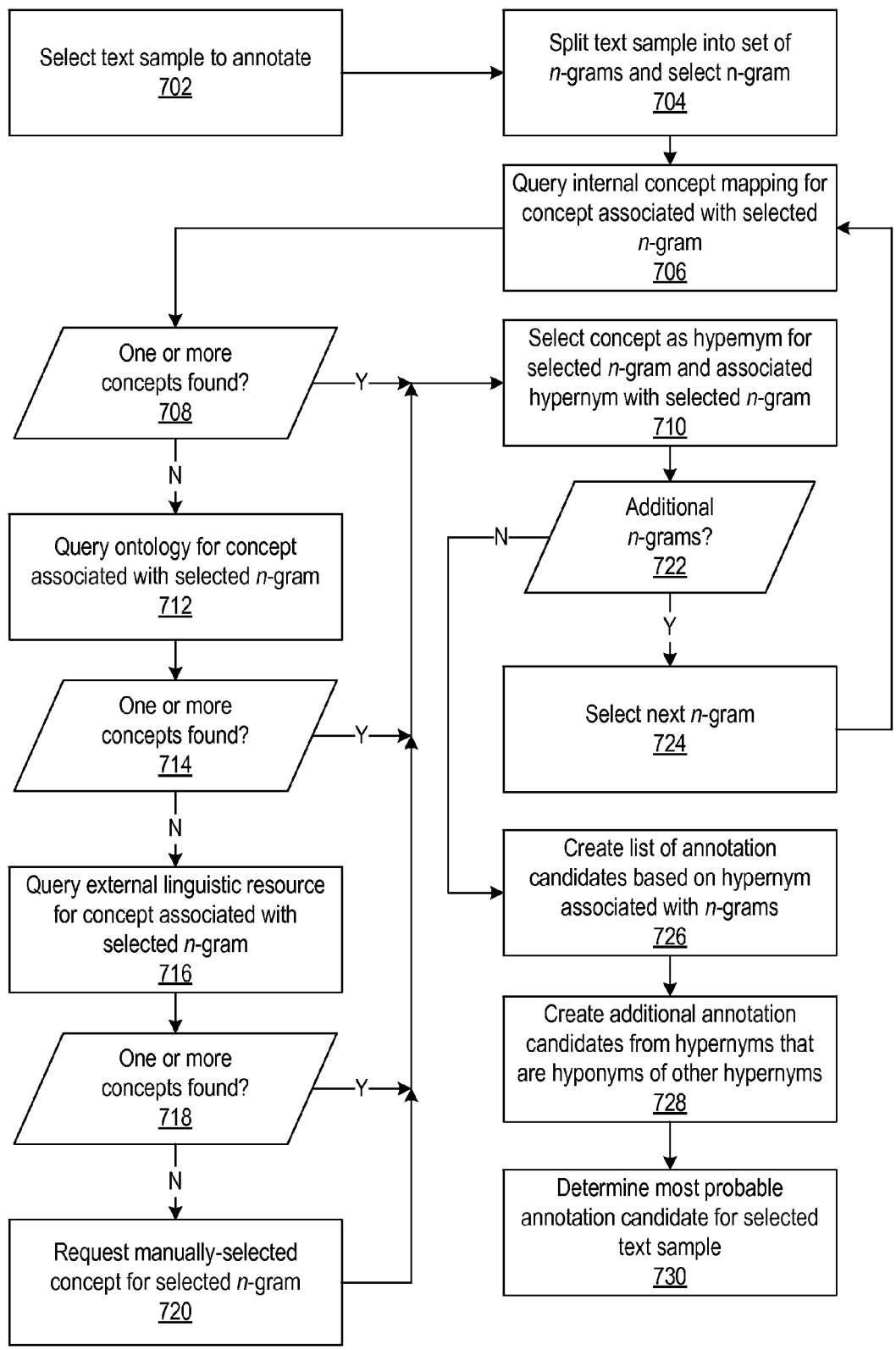
FIG. 7 is a flowchart of example method steps for annotating a text sample according to illustrative aspects described herein.

Referring now to FIG. 7, a flowchart 700 of example method steps for annotating a text sample is shown. The steps of FIG. 7 will be described with additional reference to the text sample 200 of FIG. 2, the portion 400 of the ontology 124 of FIG. 4, and the list 500 of annotation candidates 502a-e of FIG. 5. Through the annotation process text sample are transformed into one or more annotations, and a grammar construction module may subsequently use those annotations to derive rules for an NLU grammar under construction. The steps described below may advantageously speed up the process of annotating text samples to obtain annotations with which an NLU grammar may be constructed.

During the annotation process, an annotation module may select a text sample to annotate from a set of text samples (block 702). The set of text samples to be annotated may be separate from the text samples corresponding to the training data used to train the classifier of the classifier module. The annotation module may split the text sample into a set of n-grams and select one of the n-grams for further evaluation (block 704). The annotation module may evaluate the selected n-gram to determine whether the selected n-gram is associated with a concept in a collection of semantic relationship definitions. If a concept associated with the n-gram is located, then the concept may be selected as the hypernym for the n-gram as described in further detail below. In this regard, the n-gram may be a hyponym of the hypernym located for the n-gram.

With reference to the text sample 200 shown by way of example in FIG. 2—"fly from JFK New York"—some examples of the n-grams the text sample may be split into include: "fly" and "JFK" (1-grams), "from JFK" and "New York" (2-grams), "fly from JFK" and "JFK New York" (3-grams), "from JFK New York" (4-gram), and "fly from JFK New York" (5-gram). Additional examples of n-grams will be appreciated.

The annotation module may iteratively select each of the n-grams of the selected text sample and attempt to locate a concept associated with the selected n-gram. In some example implementations, the annotation module may first query an internal concept mapping for a concept associated with the selected n-gram (block 706). If the annotation module locates a concept associated with the selected n-gram in the internal concept mapping (block 708: Y), then the annotation module may select the concept as the hypernym for the n-gram and associate the hypernym with the selected n-gram (block 710). The internal concept mapping may, for example, include a mapping of airport codes (the keys of the key-value pairs) to an "AIRPORT" concept (the value of the key value pairs). It will be appreciated that, in some circumstances, the internal concept mapping may map the selected n-gram to multiple concepts. In these circumstances, the annotation module may select each of the multiple concepts as hypernyms for the selected n-gram and associated the multiple hypernyms with the selected n-gram.

If the annotation module does not locate a concept for the selected n-gram in the internal concept mapping (block 708: N), then the annotation module may search other resources for a concept corresponding to or otherwise associated with the selected n-gram. In some example implementations, for example, the annotation module 106 may query the ontology for a concept associated with the selected n-gram (block 712). If the annotation module locates one or more concepts for the selected n-gram in the ontology (block 714: Y), then the annotation module may select the one or more concepts as the hypernyms for the selected n-gram and associate the one or more hypernyms with the selected n-gram (block 710). In the portion 400 of the example ontology 124 of FIG. 4, for example, "New York" is associated with both the "CITY" concept 406b and the "STATE" concept 404e. Accordingly, the annotation module, in this example, may associate both the "CITY" concept and the "STATE" concept with the n-gram of "New York."

If the annotation module does not locate a concept for the selected n-gram in the ontology (block 714: N), then the annotation module may query an external linguistic resource for a concept corresponding to or otherwise associated with the selected n-gram (block 716). The annotation module may, for example, submit to the external linguistic resource a request that includes the selected n-gram. The annotation module may, in turn, receive from the external linguistic resource a response that includes a concept associated with the selected n-gram or a response indicating that a concept for the selected n-gram could not be found. If the annotation module locates one or more concepts associated with the selected n-gram at the external linguistic resource (block 718: Y), then the annotation module may select the one or more concepts as hypernyms for the selected n-gram and associate the one or more hypernyms with the selected n-gram (block 710).

If the annotation module does not locate a concept for the selected n-gram at the external linguistic resource (block 718: N), then the annotation module may request a manually-selected concept for the selected n-gram (block 720). The annotation module may, for example, prompt a user to provide input corresponding to one or more concepts for the selected n-gram. The annotation module may select the manually-selected concepts received from the user as one or more hypernyms for the selected n-gram and associate the manually-selected hypernyms with the selected n-gram (block 710). It will be appreciated that not all of the n-grams obtained by splitting the selected text sample may be associated with or correspond to a concept in the internal concept mapping, the ontology, or the external linguistic resource. Additionally the user, when prompted, may choose not to manually select a concept for the selected n-gram.

The annotation module may evaluate each n-gram obtained by splitting the text sample. If there are additional n-grams to evaluate (block 722: Y), then the annotation module may select the next n-gram (block 724) and repeat steps 706-720 to locate a hypernym for the next n-gram. Once the annotation module has evaluated each of the n-grams of the text sample, i.e., when there are no more n-grams to evaluate (block 722: N), the annotation module may create a list of annotation candidates based on the hypernyms associated with the n-grams of the text sample (block 726). If an n-gram is associated with multiple hypernyms, the annotation module may create an annotation for each of the hypernyms associated with that n-gram. As shown above in FIG. 4, for example, the ontology 124 may associate the n-gram "New York" with the "CITY" hypernym and the "STATE" hypernym. The annotation module, in this example, may thus create individual annotation candidates based on these hypernyms.

Because some hypernyms may be hyponyms of other hypernyms, the annotation module may also determine whether the hypernyms of the annotation candidates. To locate other hypernyms, the annotation module may, for example, query the internal concept mapping, the ontology, or the external linguistic resource as described above. If the annotation module locates hypernyms that are hyponyms of other hypernyms, then the annotation module may create additional annotation candidates based on the hypernyms that are hyponyms of other hypernyms (block 728). As seen in FIG. 4, for example, the example ontology 124 indicates that the "LOCATION" concept 410 is a hyponym of the "AIRPORT CITY" concept 408, which consists an "AIRPORT" concept and a "CITY" concept. The annotation module may thus identify and generate the additional annotation candidate "fly from LOCATION" based on the semantic relationship 402d defined by the example ontology 124.

Once the list of annotation candidates has been determined for the selected text sample, the annotation module may determine which annotation candidate is the most probable annotation for the selected text sample (block 730). As noted above, the classifier module may classify the annotation candidates and determine a score for each annotation candidate. As also noted above, various approaches may be selectively employed to classify and score the annotation candidates, e.g., using a TF-IDF classifier or using an NB classifier. In order to provide accurately classify and score the annotation candidates, the classifier of the classifier module may be trained using a set of training data. Those skilled in the art of probabilistic classification will recognize that a classifier, generally speaking, is a tool for identifying which category an new observation belongs to on the basis of a training data set containing prior observations for which the category is known. Accordingly various operational details of the approaches described below regarding the classification of annotation candidates using TF-IDF and NB classifiers will be appreciated by those skilled in the art.

Figure 8:
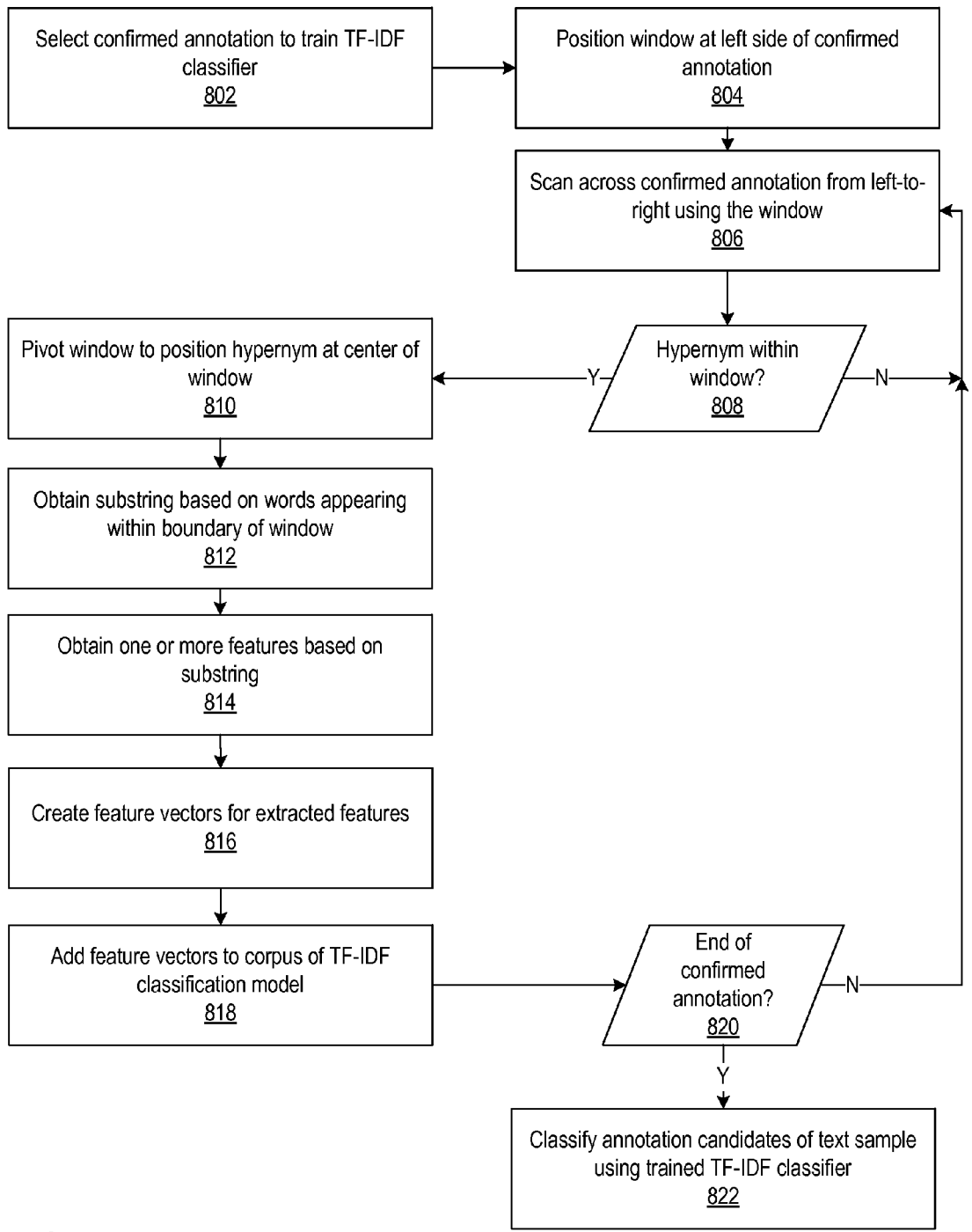
FIG. 8 is a flowchart of example method steps for training a TF-IDF classifier according to illustrative aspects described herein.

In FIG. 8, a flowchart 800 of example method steps for training a TF-IDF classifier is shown. The steps of FIG. 8 will be described with additional reference to FIGS. 9A-B, which illustrate portions of the training process. The training data used to train the TF-IDF classifier may be a set of confirmed annotations as described above. To train the TF-IDF classifier, the classifier module may select one of the confirmed annotations from the set of training data (block 802). As described in further detail below, the classifier module may obtain one or more features based on the confirmed annotation selected. As noted above with reference to FIG. 1, the classifier module 104 may be a TF-IDF classifier and may include a feature extractor 114 used to extract features from the confirmed annotation selected.

Stated generally, the feature extractor extracts features from a confirmed annotation by scanning the confirmed annotation from left-to-right using a window of a predetermined width. The width of the window may be specified based on the number of words that appear in the window, e.g., a window three words wide. In some example implementations, the width of the window may be configured using an odd value such that a word of the confirmed annotation may be positioned at the center of the window with an equal number of words on either side. It will be appreciated, however, that a word may be positioned near the center of the window rather than at the center of the window where the width of the window is configured using an even value or where the window is positioned at or near an end of the confirmed annotation. When the feature extractor detects a hypernym within the boundaries of the window, the feature extractor may pivot the window such that the detected hypernym is positioned at the center of the window. The feature extractor may obtain a substring from the words of the confirmed annotation that appear within the boundaries of the pivoted window. The feature extractor may then obtain one or more features for the confirmed annotation based on the substring. The feature extractor may continue to scan and obtain features in this fashion until the window reaches the end of the confirmed annotation.

Figure 9A:
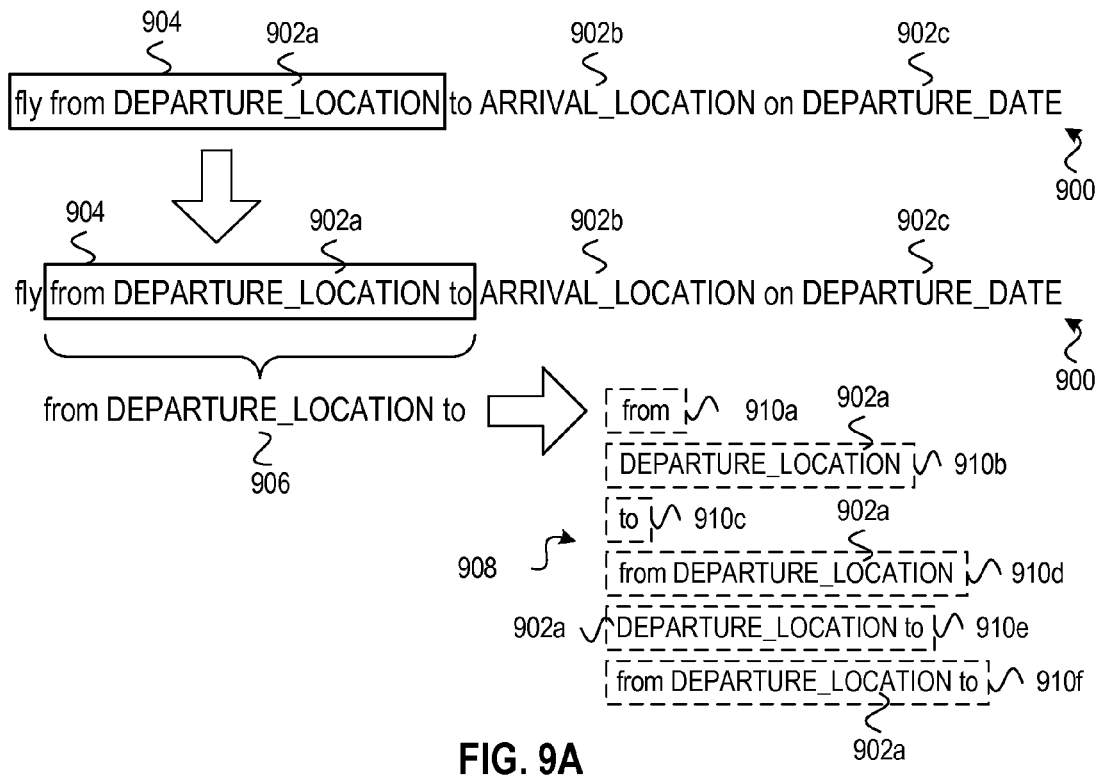
FIG. 9A is an illustration of a portion of the training process for a TF-IDF classifier according to illustrative aspects described herein.

FIG. 9A illustrates an example confirmed annotation 900 that may be selected to train a TF-IDF classifier. 900. As seen in FIG. 9A, the confirmed annotation 900, in this example, includes multiple hypernyms 902a-c. The feature extractor may utilize a window 904 to scan the confirmed annotation. The window 904, in this example, has a width of three words. As indicated in FIG. 8, the feature extractor may initially position a window 904 at the left side of the confirmed annotation 900 (block 804). The feature extractor may then scan across the confirmed annotation from left-to-right using the window (block 806). If the feature extractor does not detect a hypernym within the boundaries of the window (block 808: N), then the feature extractor may continue to scan across the confirmed annotation using the window (block 806).

As seen in FIG. 9A, the window 904 includes the "DEPARTURE_LOCATION" hypernym 902a when the window 904 is initially positioned at the left side of the confirmed annotation 900. When the feature extractor detects a hypernym within the boundaries of the window (block 808: Y), the feature extractor may pivot the window such that the detected hypernym is positioned at the center of the window (block 810). As illustrated in FIG. 9A, the window 904 pivots upon detection of the "DEPARTURE_LOCATION" hypernym 902a such that the detected hypernym appears at the center of the window with the words "from" and "to" also appearing within the boundaries of the window on either side of the detected hypernym.

The feature extractor may then obtain a substring based on the words appearing within the boundaries of the pivoted window (block 812). As seen in FIG. 9A, the substring 906—"from DEPARTURE_LOCATION to"—includes the "DEPARTURE_LOCATION" hypernym 902a. The feature extractor may then obtain one or more features for the confirmed annotation (block 814) by splitting the substring into a set of n-grams. Some of the n-grams may correspond to a feature for the confirmed annotation. As seen in FIG. 9A, the set of n-grams 908 obtained from the substring 906 includes the 1-grams 910a-c, the 2-grams 910d-e, and the 3-gram 910f. As noted above, a feature includes at least one hypernym and at least one word adjacent to the hypernym. Accordingly the n-grams in the set of n-grams 908 that correspond to features include the n-grams 910d-f. The feature extractor may then create respective feature vectors for the extracted features (block 816) and then add the feature vectors to the corpus of the TF-IDF classifier (block 818). In this way, the corpus of the TF-IDF classifier may be updated during the training process.

Figure 9B:
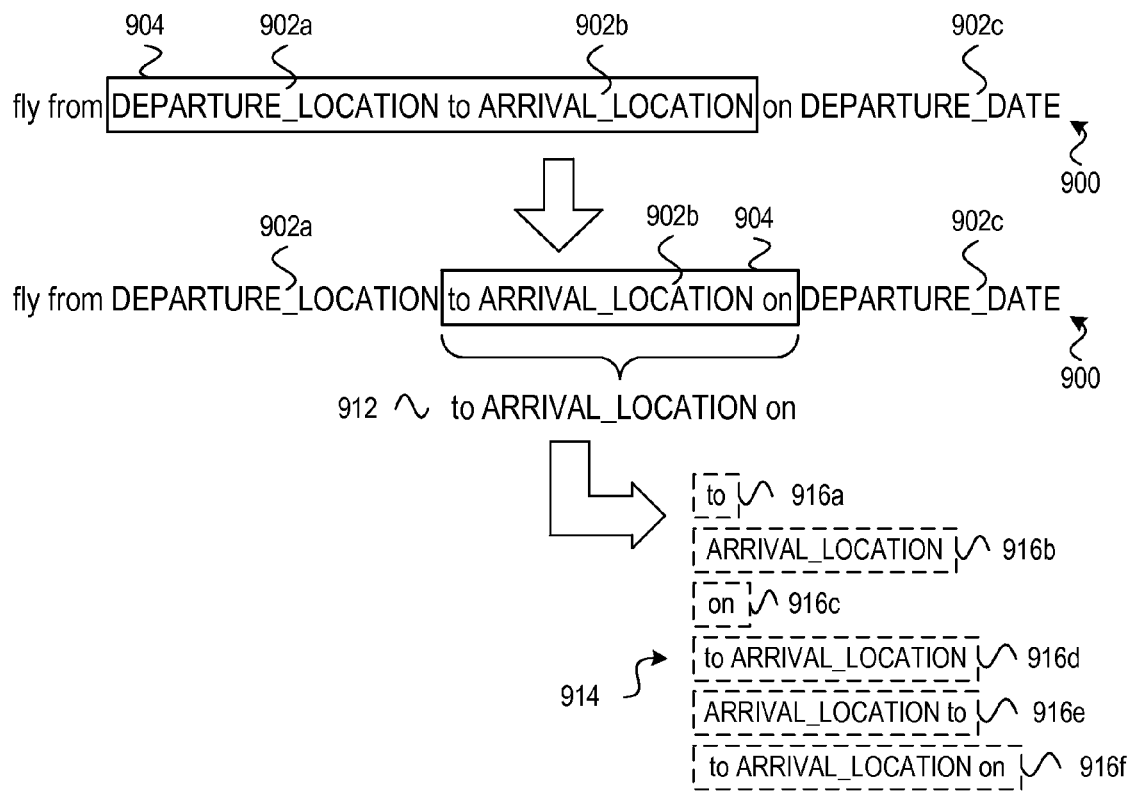
FIG. 9B is an illustration of another portion of the training process for a TF-IDF classifier according to illustrative aspects described herein.

If the window has not yet reached the end of the confirmed annotation (block 820: N), then the feature extractor may continue to scan across the confirmed annotation (block 806) as described above. The feature extractor may repeat steps 810-818 for additional hypernyms detected in the confirmed annotation. FIG. 9B illustrates another hypernym 902b of the confirmed annotation 900 that may be detected by the feature extractor when the hypernym appears in the window 904 scanned across the confirmed annotation. As seen in FIG. 9B, the window 904 may pivot upon detection of the "ARRIVAL_LOCATION" hypernym 902b such that the detected hypernym is positioned at the center of the window. The feature extractor may obtain another substring 912—"to ARRIVAL_LOCATION on"—which includes the "ARRIVAL_LOCATION" hypernym 902b. The feature extractor may similarly split the substring into n-grams to obtain another set of n-grams 914 by. As seen in FIG. 9B, the set of n-grams 914 obtained from the substring 912 includes the 1-grams 916a-c, the 2-grams 916d-e, and the 3-gram 916f. The n-grams of the set of n-grams 914 that correspond to features, in this additional example, include the n-grams 916d-f. The feature extractor may likewise create feature vectors for the n-grams 916d-f and add these additional feature vectors to the corpus of the TF-IDF classifier of the classifier module.

When the window reaches the end of the confirmed annotation (block 820: Y), feature extraction for the confirmed annotation may be complete. Additional confirmed annotations may be selected to further train the TF-IDF classifier, and steps 802-820 may be repeated for the additional confirmed annotations selected. Once the TF-IDF classifier has been trained, the annotation module may employ the TF-IDF classifier to classify annotation candidates of a text sample (block 822). Based on the classifications of the annotation candidates, the annotation module may suggest an annotation candidate as the most probable annotation for the text sample.

Figure 10:
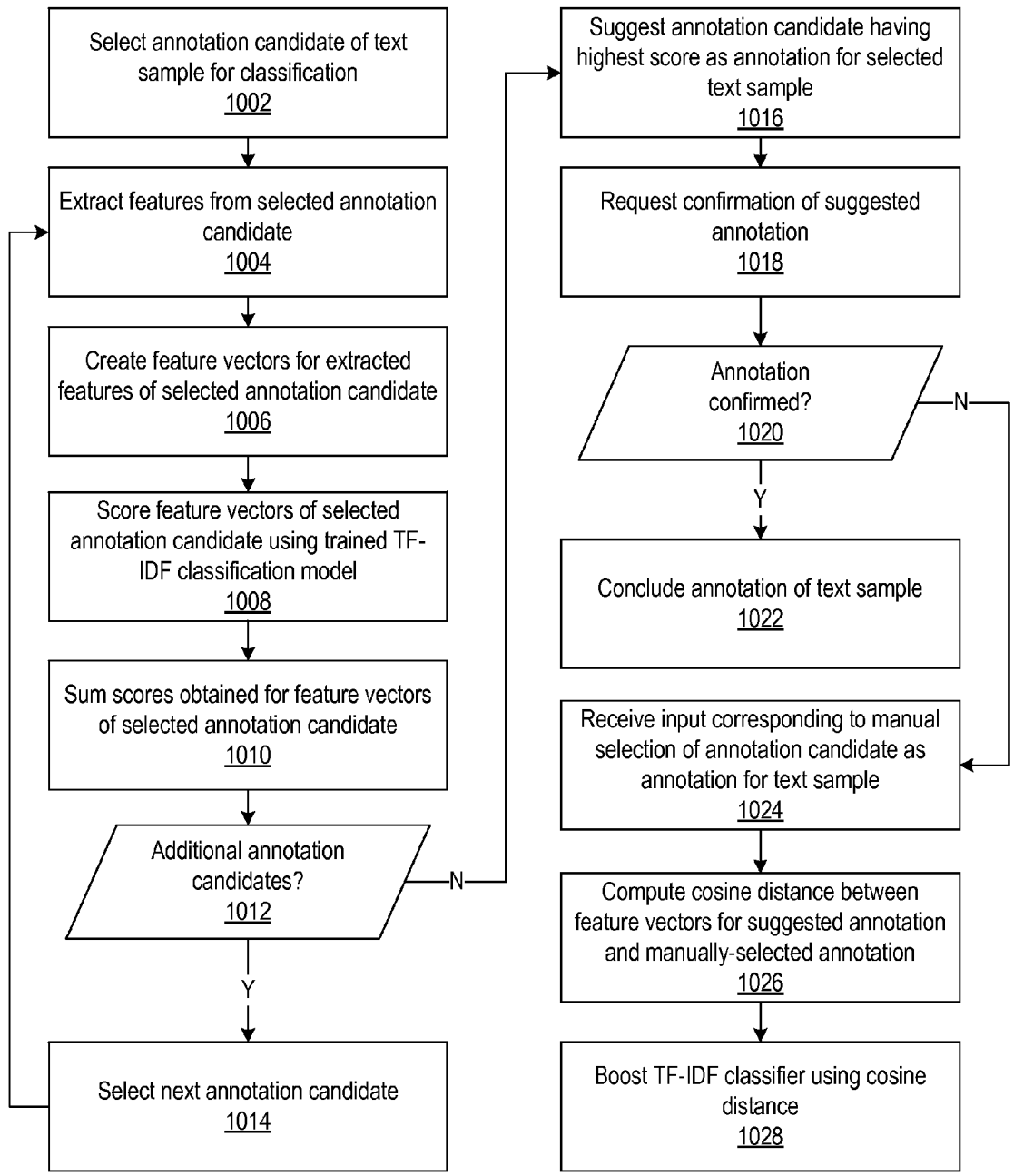
FIG. 10 is a flowchart of example method steps for classifying a list of annotation candidates using a trained TF-IDF classifier according to illustrative aspects described herein.

In FIG. 10 a flowchart 1000 of example method steps for classifying a list of annotation candidates using a trained TF-IDF classifier is shown. As noted above, the classifier module 104 may be a TF-IDF classifier module, and the classifier 116 may be a TF-IDF classifier. The classifier module may select an annotation candidate of a text sample for classification (block 1002). The feature extractor of the classifier module may extract features from the selected annotation candidate (block 1004) as described above with reference to FIG. 8. The feature extractor may also create feature vectors for the extracted features of the selected annotation candidate (block 1006). The TF-IDF classifier may then score the feature vectors of the selected annotation candidate (block 1008). The particular details of scoring feature vectors using a TF-IDF classifier will be appreciated by those familiar with TF-IDF classifiers. In some example implementations, the TF-IDF classifier may score each feature vector of the selected annotation candidate. The classifier module may then sum the TF-IDF scores obtained for the feature vectors of the selected annotation candidate (block 1010).

If there are additional annotation candidates that remain to be classified (block 1012: Y), then the classifier module may select the next annotation candidate from the list of annotation candidates for the text sample (block 1014) and repeat steps 1004-1010 in order to score the next annotation candidate. If no additional annotation candidates remain to be classified (block 1012: N), then an annotation module may suggest the annotation candidate having the highest TF-IDF score as the annotation for the text sample (block 1016). The annotation module may suggest an annotation candidate as the annotation for the text sample, e.g., by presenting the suggested annotation candidate at a display device of a grammar construction system.

In some example implementations, the annotation module may prompt the user to confirm the suggested annotation candidate as the annotation for the text sample (block 1018). The user may thus accept or reject a suggested annotation candidate for the text sample. If the user confirms the suggested annotation candidate as the annotation for the text sample (block 1020: Y), then annotation module may conclude annotation of the text sample (block 1022). Steps 1002-1018 may be repeated to obtain respective annotations for additional text samples.

If, however, the user rejects the suggested annotation candidate for the text sample (block 1020: N), the user may manually select an annotation for the text sample. The manually-selected annotation may be another one of the annotation candidates in the list of annotation candidates for the text sample. The annotation module may present the list of annotation candidates to the user via, e.g., a context menu presented at a display device of the grammar construction system. The user, in this example, may select one of the annotation candidates as the annotation for the text sample by selecting one of the annotation candidates listed in the context menu. Accordingly, the annotation module may receive input corresponding to manual selection of an annotation candidate as the annotation for the text sample (block 1024). A user may provide user input corresponding to a manually-selected annotation candidate via one or more input devices of the grammar construction system. It will be appreciated that, in some circumstances, the manually-selected annotation may not be one of the annotation candidates includes in the list of annotation candidates for the text sample but rather a new annotation provided by the user.

Disagreements between annotation candidates suggested by the annotation module and annotations manually selected by the user may be used to further train the TF-IDF classifier. The annotation module may quantify such disagreements by, e.g., computing the cosine distance between the feature vectors for the suggested annotation candidate and the manually selected annotation (block 1026). The cosine distance may be utilized to boost the TF-IDF classifier (block 1028). In some example implementations the annotation module may rank the list of annotation candidates. In these example implementations, the annotation module may compute the cosine distance between the suggested annotation candidate at the top of the list and the manually-selected annotation candidate. The annotation module may then scale one or more IDF terms at the TF-IDF matrix of the TF-IDF classifier using the cosine distance. It will be appreciated that scaling (decreasing) the IDF term will cause the TF-IDF term to increase. The same result may be achieved by adjusting the TF term rather than the IDF term, e.g., by scaling the TF term by a factor greater than one. The annotation module may repeatedly update the TF-IDF matrix using additional cosine distances as additional annotation corrections are received via manually-selected annotation candidates. It will thus also be appreciated that the cosine distance may correspond to interest in a particular text sample. As an example, a cosine distance of about one may correspond to relatively little or no interest in a text sample while a cosine distance of about zero may correspond to relatively high interest in a text sample. In this way, the TF-IDF classifier may advantageously continue to learn as additional text samples are annotated. The steps set forth above may be repeated to annotate additional text samples during the annotation process when constructing a grammar.

Figure 11:
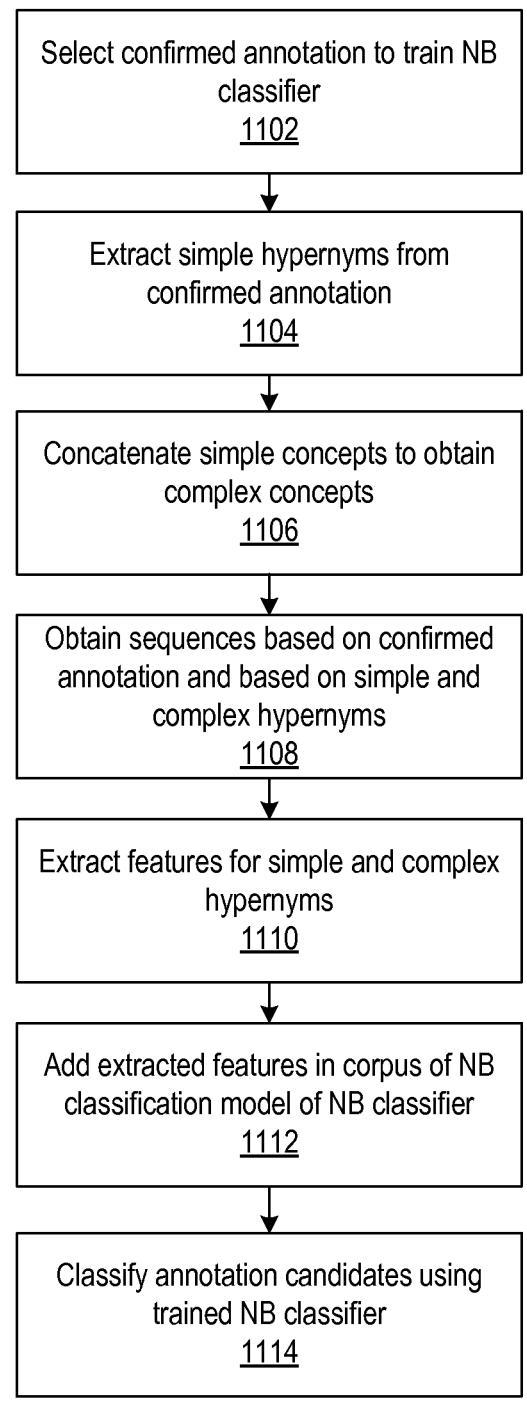
FIG. 11 is a flowchart of example method steps for training an NB classifier according to illustrative aspects described herein.
Figure 12:
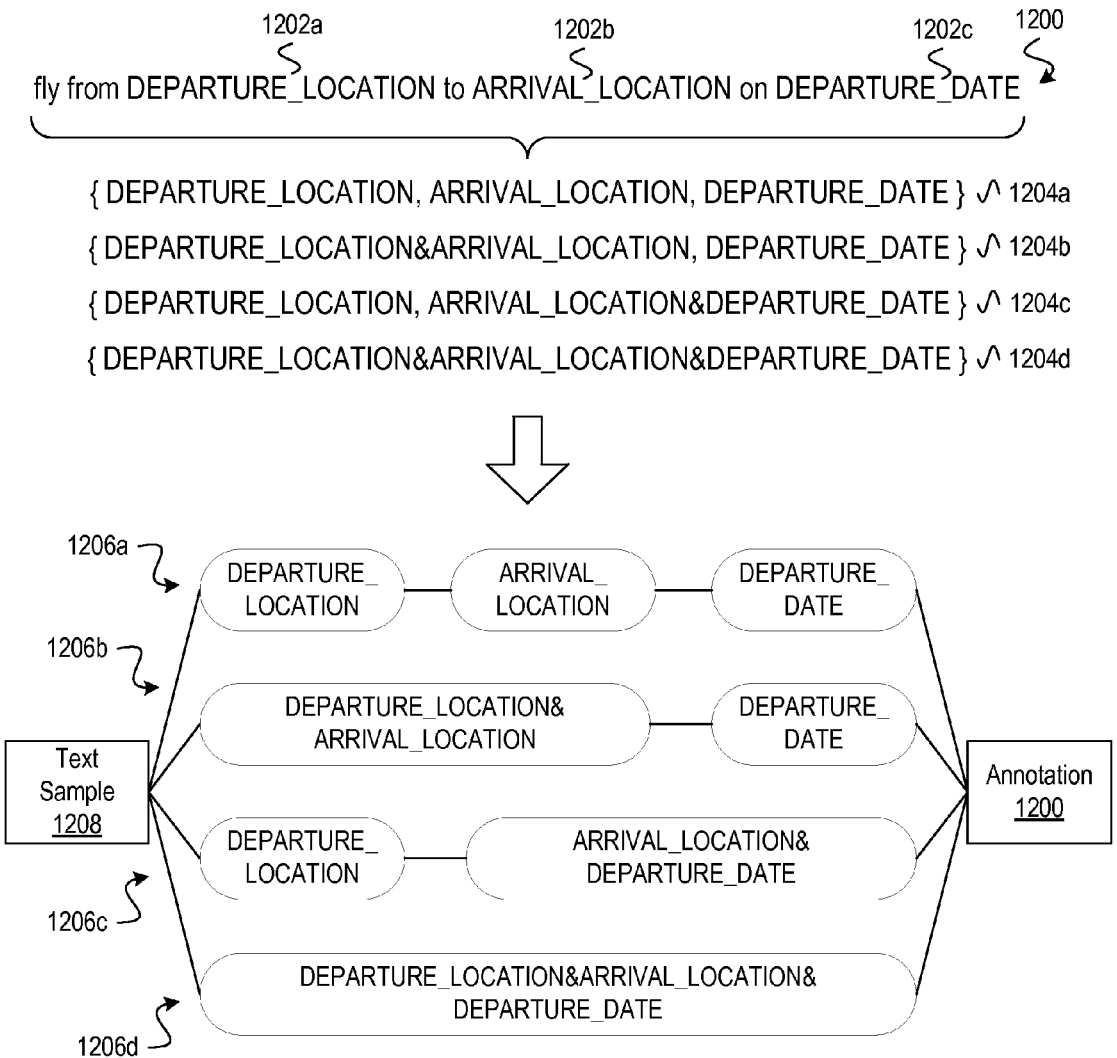
FIG. 12 is an illustration of a portion of the training process for an NB classifier according to illustrative aspects described herein.

As noted above, the classifier module 104 of FIG. 1 may alternatively be an NB classifier module, and the classifier 116 of the classifier module may alternatively be an NB classifier. An NB classifier may also be trained using a set of training data. Referring to FIG. 11, a flowchart 1100 of example method steps for training an NB classifier is shown. The steps of FIG. 11 will be described with additional reference to FIG. 12, which illustrates a portion of the training process. The training data used to train the NB classifier may likewise be a set of confirmed annotations as described above. To train the NB classifier, the classifier module may select one of the confirmed annotations from the set of training data (block 1102). FIG. 12 illustrates an example of a confirmed annotation 1200 that may be selected to train an NB classifier. As seen in FIG. 12, the confirmed annotation 1200 includes the simple hypernyms 1202*a-c*.

Stated generally, the feature extractor of the classifier module may obtain one or more features for an annotation by generating sequences of simple concepts, complex concepts, or combinations of simple and complex concepts and deriving features from those sequences. A sequence refers to a collection of each of the hypernyms of an annotation in simple or complex form in which the order of the hypernyms is preserved. The sequences of an annotation may correspond to distinct paths that may be traversed in order to transform a text sample into the annotation—e.g., to transform the text sample of "fly from Chicago to New York on January fourth" to the annotation of "fly from DEPARTURE_LOCATION to ARRIVAL_LOCATION on DEPARTURE_DATE." The probability of each hypernym (simple or complex) of a sequence is then determined, and the respective probabilities of the hypernyms are then used to determine a probability for the sequence. The respective sequence probabilities of each sequence for an annotation are then used to determine a probability for the annotation. As described in further detail below, an annotation module may suggest an annotation candidate as the annotation for a text sample based on the respective probabilities of the annotation candidates in the list of annotation candidates for the text sample.

Referring back to FIG. 11, the feature extractor of the classifier module may extract the simple hypernyms from the confirmed annotation selected (block 1104). The feature extractor may then concatenate the simple hypernyms of the confirmed annotation to obtain complex hypernyms (block 1106). As seen in FIG. 12, the simple hypernyms of the confirmed annotation 1200, in this example, include the "DEPARTURE_LOCATION" simply hypernym 1202a, the "ARRIVAL_LOCATION" simple hypernym 1202b, and the "DEPARTURE_DATE" simple hypernym 1202c.

The feature extractor, in this example, may thus create the following complex hypernyms based on the example confirmed annotation 1200:
"DEPARTURE_LOCATION&ARRIVAL_LOCATION,"
"ARRIVAL_LOCATION&DEPARTURE_DATE," and
"DEPARTURE_LOCATION&ARRIVAL_LOCATION&DEPARTURE_DATE."

Having obtained the complex hypernyms for the confirmed annotation selected, the feature extractor may then obtain one or more sequences based on the confirmed annotation and based on the simple and complex hypernyms of the confirmed annotation (block 1108). As seen in FIG. 12, the feature extractor may obtain four distinct sequences 1204a-b based on the confirmed annotation 1200 in this example. As also seen in FIG. 12, the sequence 1204a includes each of the three simple hypernyms extracted from the confirmed annotation 1200; the sequences 1204b and 1204c each include one simple hypernym and one complex hypernym corresponding to a concatenation of two of the simple hypernyms; and the sequence 1204d includes one complex hypernym corresponding to a concatenation of each of the three simple hypernyms. As noted above, each of the sequences may correspond to a respective path 1206a-d that may be traversed to transform a text sample 1208 into the confirmed annotation 1200. In this example, path 1206a may correspond to sequence 1204a, path 1206b may correspond to sequence 1204b, path 1206c may correspond to sequence 1204c, and path 1206d may correspond to sequence 1204d.

Having obtained the complex hypernyms, the feature extractor may then extract one or more features for each of the simple and complex hypernyms (block 1110). As described above a feature refers to an n-gram that includes at least one hypernym and at least one word adjacent to the hypernym. It will thus be appreciated that multiple features for a hypernym may be extracted from an annotation.

With reference to the confirmed annotation 1200 shown by way of example in FIG. 12—"fly from DEPARTURE_LOCATION to ARRIVAL_LOCATION on DEPARTURE_DATE—some examples of the features for the simple and complex sequences include the following n-grams of the confirmed annotation 1200: "fly from DEPARTURE_LOCATION to" and "DEPARTURE_LOCATION to" for the simple hypernym of "DEPARTURE_LOCATION," "to ARRIVAL_LOCATION on" and ARRIVAL_LOCATION on" for the simple hypernym of "ARRIVAL_LOCATION," "on DEPARTURE_DATE" for the simple hypernym of "DEPARTURE_DATE," "fly from DEPARTURE_LOCATION to ARRIVAL_LOCATION on" and "DEPARTURE_LOCATION to ARRIVAL_LOCATION" for the complex hypernym of "DEPARTURE_LOCATION&ARRIVAL_LOCATION," "to ARRIVAL_LOCATION on DEPARTURE_DATE" and "ARRIVAL_LOCATION on DEPARTURE_DATE" for the complex hypernym of "ARRIVAL_LOCATION&DEPARTURE_DATE," and "fly from DEPARTURE_LOCATION to ARRIVAL_LOCATION on DEPARTURE_DATE" and "DEPARTURE_LOCATION to ARRIVAL_LOCATION on DEPARTURE_DATE" for the complex hypernym of "DEPARTURE_LOCATION&ARRIVAL_LOCATION&DEPARTURE_DATE". Additional examples of features will be appreciated with the benefit of this disclosure.

Having extracted the features from the confirmed annotation selected, the feature extractor may add the extracted features to the corpus of the NB classifier (block 1112). In this way, the corpus of the NB classifier may be updated during the training process. As also described above, the NB classifier may be trained using multiple confirmed annotations. Accordingly steps 1102-1112 may be repeated for additional confirmed annotations from a set of training data. In this way, the feature extractor may develop the corpus of the NB classifier, which may be subsequently utilized to compute feature probabilities for the features of an annotation candidate. It will be appreciated that the feature probabilities of the features of the corpus may correspond to the frequencies of the respective features in the corpus. Once the NB classifier has been trained, the NB classifier may be utilized to classify annotation candidates (block 1114).

Figure 13:
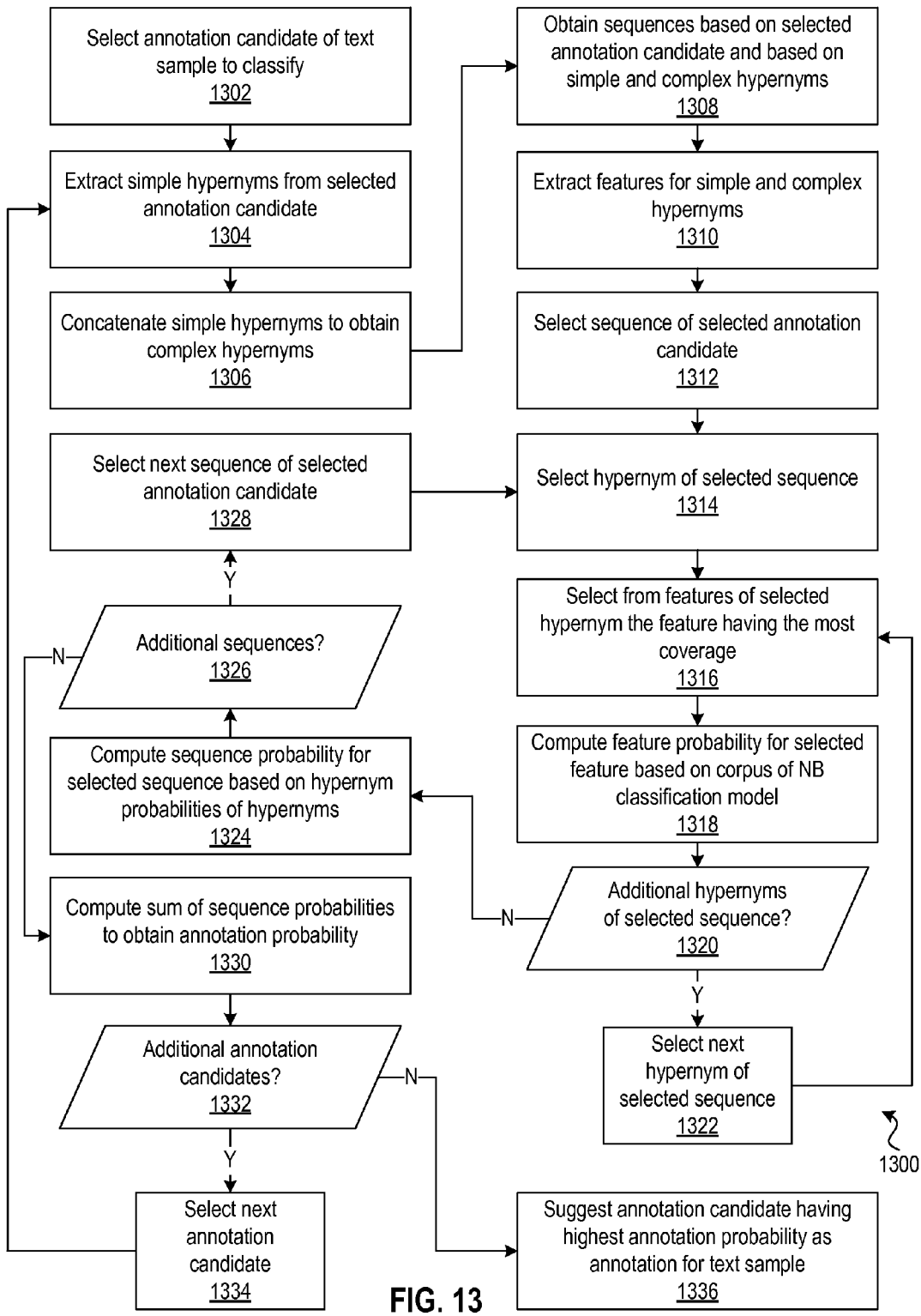
FIG. 13 is a flowchart of example method steps for classifying a list of annotation candidates using an NB classifier according to illustrative aspects described herein.

Referring now to FIG. 13, a flowchart 1300 of example method steps for classifying a list of annotation candidates using an NB classifier is shown. The classifier module may start the classification process by selecting one of the annotation candidates from the list of annotation candidates for a text sample (block 1302). Similar to the training process described above with reference to FIG. 11, the feature extractor of the classifier module may extract the simple hypernyms of the selected annotation candidate (block 1304) and iteratively concatenate the simple hypernyms in order to obtain one or more complex hypernyms for the selected annotation candidate (block 1306). The feature extractor may then obtain one or more sequences based on the selected annotation candidate and based on the simple and complex hypernyms of the selected annotation candidate (block 1308). The feature extractor may also extract one or more features for the simple and complex hypernyms (block 1310).

Having obtained the sequences and features for the selected annotation candidate, the NB classifier may score the annotation candidate. As noted above, when the classifier is an NB classifier, the score for the annotation candidate may be a probability score. The probability score for an annotation candidate may thus be referred to as the annotation probability. The classifier module may thus compute the annotation probability for the selected annotation candidate. An annotation probability, $q_a$, may be based on one or more sequence probabilities, $q_s$, for the respective sequences of an annotation. A sequence probability, $q_s$, may in turn be based on one or more hypernym probabilities, $q_h$, for the respective hypernyms of a sequence. The hypernym probability, $q_h$, of a hypernym may be based on the feature probability for one of the features that includes the hypernym. As noted above, the feature probability of a feature may be determined using the corpus of the NB classifier. In some example implementations, the feature probability of a feature may correspond to the frequency of the feature in the corpus of the NB classifier. In addition the sequence probability, $q_s$, of a sequence may be the product of the respective hypernym probabilities, $q_h$, of the individual hypernyms of the sequence, e.g., $q_s = q_{h1} \times q_{h2} \times \ldots \times q_{hn}$. Furthermore the annotation probability, $q_a$, of an annotation may, in some example implementations, be the sum of the respective sequence probabilities, $q_s$, of the individual sequences of the annotation, e.g., $q_a = q_{s1} + q_{s2} + \ldots + q_{sn}$. The classifier module may determine an annotation probability in this way for each annotation candidate in the list of annotation candidates for a text sample.

Referring back to FIG. 13, the classifier module may begin classifying the selected annotation candidate by selecting one of the sequences of the annotation candidate (block 1312) and then selecting one of the hypernyms of the selected sequence (block 1314). As shown above with reference to FIG. 11, the feature extractor may obtain multiple features for a hypernym wherein individual features that include the hypernym include relatively more or relatively fewer words adjacent to the hypernym. In order to determine the hypernym probability, $q_h$, for the selected hypernym, one of the features for the hypernym may be selected. In some example implementations, the feature of the hypernym having the most coverage may be selected to determine the hypernym probability, $q_h$, for the selected hypernym (block 1316). Referring back to the example annotation discussed above with reference to FIG. 12, the feature extractor may extract for the "DEPARTURE_LOCATION" hypernym features that include "fly from DEPARTURE_LOCATION to" and "from DEPARTURE_LOCATION." Because the former feature, in this example, includes more words than the latter feature (i.e., has more coverage), the former feature may be selected to determine the hypernym probability, $q_h$, of the "DEPARTURE_LOCATION" hypernym.

Having selected one of the features for the hypernym, the NB classifier may compute the feature probability for the selected feature based on the corpus of the NB classifier (block 1318). If the selected sequence includes additional hypernyms (block 1320: Y), the classifier module may select the next hypernym of the selected sequence (block 1322) and repeat steps 1316-1318 to compute the hypernym probability for the next hypernym of the selected sequence. If there are no additional hypernyms of the selected sequence (block 1320: N), the classifier module may compute the sequence probability, $q_s$, for the selected sequence based on the respective hypernym probabilities for the hypernyms of the selected sequence (block 1324). If additional sequences of the selected annotation candidate remain to be scored (block 1326: Y), then the classifier module may select the next sequence of the selected annotation candidate (block 1328) and repeat steps 1314-1324 to compute the sequence probability for the next sequence. If no additional sequences of the selected annotation candidate remain to be scored (block 1326: N), then the classifier module may compute the sum of the sequence probabilities in order to obtain the annotation probability, $q_a$, for the selected annotation candidate (block 1330).

If the list of annotation candidates includes additional annotation candidates to be scored (block 1332: Y), then the classifier module may select the next annotation candidate (block 1334) and repeat steps 1304-1330 in order to compute the annotation probability, $q_a$, for the next annotation candidate. If no more annotation candidates in the list of annotation candidates remain to be scored (block 1332: N), then the annotation module may suggest the annotation candidate having the highest annotation probability, $q_a$, as the annotation for the text sample being annotated (block 1336). The steps set forth above may be repeated to annotate additional text samples during the annotation process when constructing a grammar.

In some example implementations, the classifier module may normalize the respective sequence probabilities of an annotation probability. By normalizing the sequence probabilities, the classifier module may ensure an annotation probability does not exceed one. The classifier module may normalize an annotation probability, $q_a$, by dividing each sequence probability, $q_s$, by the sum of all sequence probabilities computed for a text sample as described above. For example, let $q_s'$ denote a normalized sequence probability. The normalized sequence probability, $q_s'$, for a sequence probability, $q_s$, associated with a text sample having n sequences may thus be: $q_s' = q_s/(q_{s1}+q_{s2}+ \ldots +q_{sn})$. The annotation probability, $q_a$, for an annotation may thus be the sum of the normalized sequence probabilities, $q_s'$, is some example implementations.

By providing suggestions of the most probable annotation for a text sample, the grammar construction system advantageously speeds up the annotation process during grammar construction. Once text samples have been annotated, a grammar construction system (e.g., grammar construction system 100 of FIG. 1) may generate a grammar (e.g., grammar 110) based on the ontology (e.g., ontology 124), the annotations of text samples (e.g., annotations 120), and the classifier (e.g., classifier 116). The grammar may be composed of a set of grammar rules, and the grammar construction module (e.g., grammar construction module 102) may derive the grammar rules from the ontology, the annotations, and the classifier.

With respect to the ontology, the grammar construction module may derive one set of grammar rules from the semantic relationships defined by the ontology. As an example, the grammar construction module may derive grammar rules from an ontology similar to the ontology 124 of FIG. 4 that defines semantic relationship between airport codes, cities, and states and their respective hypernyms.

Some examples of ontology-derived grammar rules may include the following grammar rules, which are presented in an Augmented Backus-Naur Form (ABNF) format:

```
$DEPARTURE_LOCATION =
    $LOCATION;
$LOCATION =
    $CITY
    | $AIRPORT
    | $AIRPORT $CITY
    | $COUNTRY
    | $CITY $COUNTRY
$CITY =
    Atlanta
    | Chicago
    | Pittsburgh
    | St. Louis
```

These ontology-derived grammar rules are provided by way of example only. Additional examples will be appreciated with the benefit of this disclosure. Moreover the ontology-derived grammar rules may depend on the particular subject matter of the ontology.

With respect to the annotations, the grammar construction module may derive another set of grammar rules from the annotations of the text samples obtained during the annotation process. The annotations may demonstrate how the hypernyms may be meaningfully connected in a natural language statement, e.g., "I would like to book a flight from $DEPARTURE_LOCATION to $ARRIVAL_LOCATION." In some example implementations, annotation-derived rules may include all of the words of a text sample that were not replaced by a hypernym as shown below. As a result annotation-derived grammar rules may be considered to be relatively less robust grammar rules. The grammar construction module may construct the grammar such that the non-robust annotation-derived grammar rules are children of the root grammar rule.

Some examples of annotation-derived grammar rules may include the following grammar rules, which are also presented in an ABNF format:

```
$root =
   ...
   I would like to book a flight from $DEPARTURE_LOCATION to
   $ARRIVAL_LOCATION
   | I am leaving from $DEPARTURE_LOCATION on
   $DEPARTURE_DATE
   | I would like to fly from $DEPARTURE_LOCATION to
   $ARRIVAL_LOCATION on $DEPARTURE_DATE
```

As seen in these example annotation-derived grammar rules, all the words of the text samples that were not replaced with hypernyms are carried through to the annotations and then to the grammar rules derived from the annotations. Again these annotation-derived grammar rules are provided by way of example, and additional examples will be appreciated with the benefit of this disclosure.

With respect to the classifier, the grammar construction module may derive an additional set of grammar rules from the features extracted for the classifier of the classifier. As shown above, features extracted from an annotation may include only some of the words of a text sample, e.g., the words adjacent to the hypernym in an annotation. As a result classification-derived grammar rules may be considered to be relatively more robust grammar rules. In some example implementations, the grammar construction module may construct the grammar such that the classifier-derived grammar rules are also children of the root grammar rule.

Some examples of classifier-derived grammar rules may include the following grammar rules, which are again presented in an ABNF format:

```
         $root =
            ...
            | to $ARRIVAL_LOCATION
            | from $DEPARTURE_LOCATION
            | on $DEPARTURE_DATE
```

As seen in these example classifier-derived rules, only some of the words of the text sample are included in the grammar rule, e.g., rules based on features extracted from the annotation for the text sample. As a result, a grammar that includes these rules may be capable of correctly parsing phrases such as "fly to Chicago from Atlanta" even if no corresponding annotation of "fly to ARRIVAL_LOCATION from DEPARTURE_LOCATION." If, in this example, the training data included annotations in which the hypernym "DEPARTURE_LOCATION" precedes the hypernym "ARRIVAL_LOCATION." then the grammar may successfully parse the example phrase using the classifier-derived grammar rules based on the features of annotations in the training data. The classifier-derived grammar rules shown above are again provided by way of example only and additional examples will be appreciated with the benefit of this disclosure.

Furthermore the grammar construction module may configure the grammar such that the rules of the grammar are sorted. In some example implementations, the grammar construction module may sort rules of the grammar based on respective weighting values associated with features used to derive the rules. The classifier of the classifier module may compile statistical information related to the features selected for a text sample during the annotation process. Accordingly the feature weight of a feature may depend on how often the feature is selected to annotate a text sample. Accordingly a feature that is used to annotate a text sample relatively more often may be associated with a relatively higher feature weight while a feature that is used to annotate a text sample relatively less often may be associated with a relatively lower feature weight. In this way, the grammar rules corresponding to the features most often used to annotate a text sample may reside at the top of the list of grammar rules. In addition the grammar construction module may, in some example implementations, only derive rules from the classifier for features having relatively higher feature weights such that the grammar omits classifier-derived rules based on features having relatively lower feature weights.

As noted above the grammar constructed using the grammar construction system may be utilized for the development of speech applications. A speech application may be configured to include the grammar such that the speech application may parse text corresponding to received speech audio using the grammar. The speech application may receive speech audio from an individual via an audio input device such as a microphone. The speech application may obtain an electronic representation of the speech audio, e.g., an audio file. The speech application may then transform the audio file into a text file using a speech recognition module. The speech application may then parse and annotate the text file using the grammar during lexical analysis of the text file. As shown above, one example of a speech application may be a speech application for making airline reservations based on speech audio received from an individual regarding a desired departure location, arrival location, and departure date. It will be appreciated, however, that speech applications may be developed as described above for additional and alternative activities and endeavors.

Figure 14:
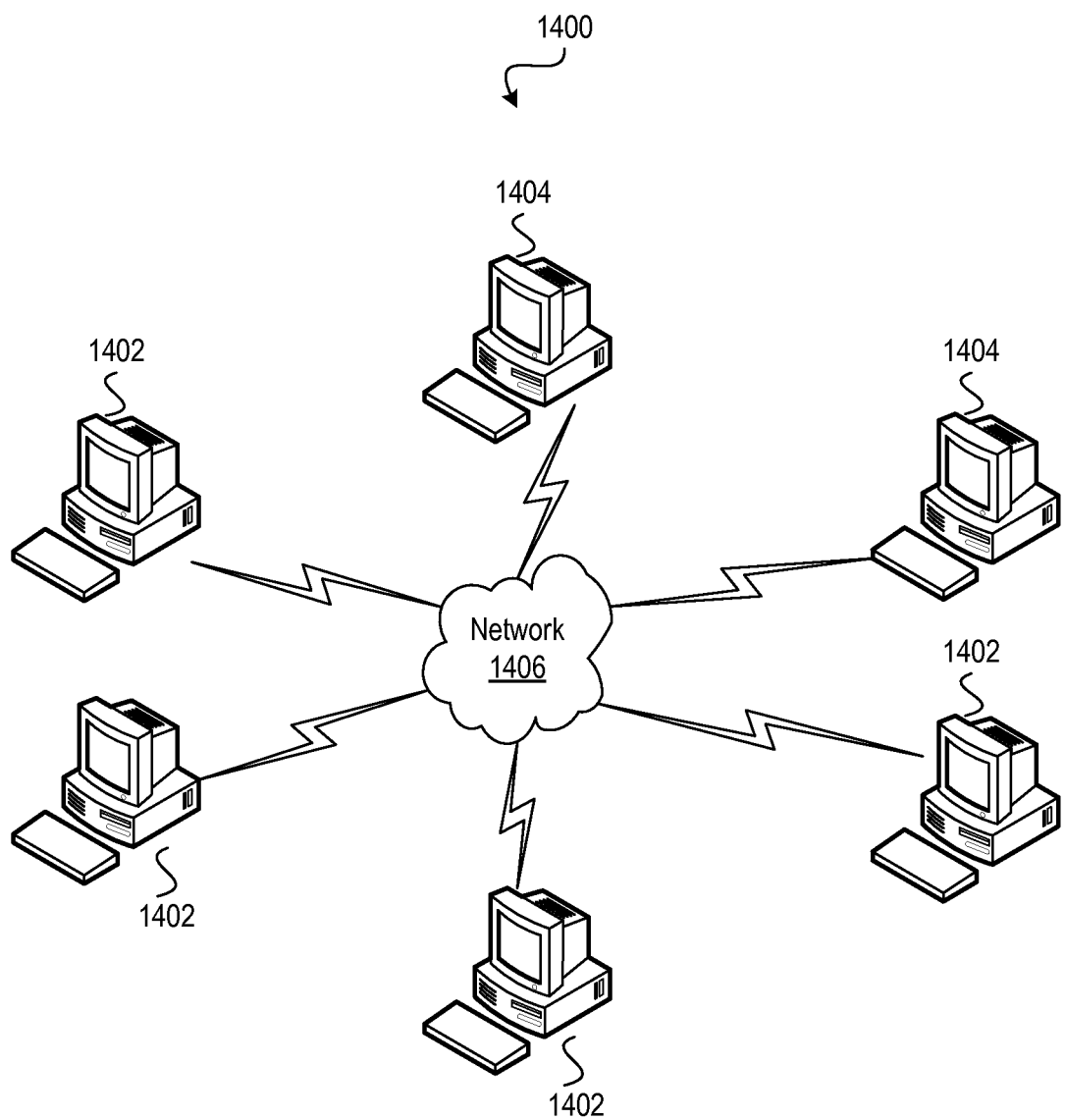
FIG. 14 is an example of an implementation of a computing environment in which aspects of the present disclosure may be implemented according to illustrative aspects described herein.

In FIG. 14, an example of an implementation of a computing environment 1400 in which aspects of the present disclosure may be implemented is shown. Client computing devices 1402 and server computing devices 1404 provide processing, storage, and input/output devices executing application programs and the like. Client computing devices 1402 may include, e.g., desktop computers, laptop computers, tablet computers, palmtop computers, smartphones, smart televisions, and the like. Client computing devices 1402 can also be linked through communications network 1406 to other computing devices, including other client devices computing devices 1402 and server computing devices 1404. Communications network 1406 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Figure 15:
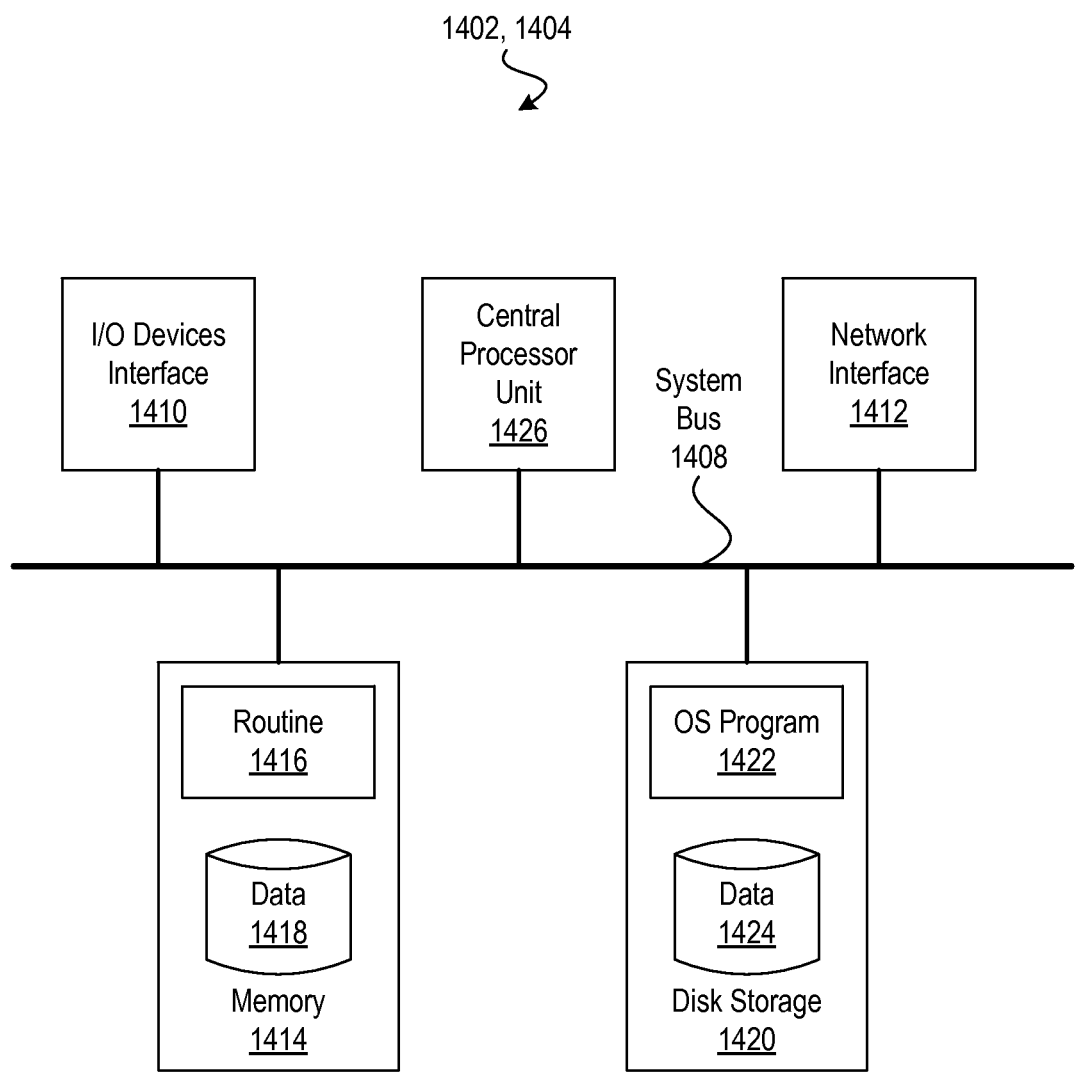
FIG. 15 is a block diagram of one of the computing devices of the computing environment of FIG. 14 according to illustrative aspects described herein.

In FIG. 15, a block diagram of one of the computing devices 1402 or 1404 of the computing environment 1400 of FIG. 14 is shown. The computing device 1402 or 1404 contains system bus 1408, where a bus is a set of hardware lines used for data transfer among the components of a computing device or processing system. Bus 1408 is essentially a shared conduit that connects different elements of a computing device (e.g., processor, disk storage, memory, input/output ports, network ports, etc.) that enables the transfer of information between the elements. Attached to system bus 1408 is I/O device interface 1410 for connecting various input and output devices (e.g., keyboard, mouse, displays, printers, speakers, etc.) to the computing device 1402 or 1404. Network interface 1412 allows the computing device to connect to various other devices attached to a network (e.g., network 1406 of FIG. 14). Memory 1414 provides volatile storage for computer software instructions 1416 and data 1418 used to implement aspects described herein (e.g., a recommendation engine implementing the steps detailed above). Disk storage 1420 provides non-volatile storage for computer software instructions 1422 and data 1424 used to implement various aspects of the present disclosure. Central processor unit 1426 is also attached to system bus 1408 and provides for the execution of computer instructions.

In one embodiment, the processor routines 1416 and 1422 as well as data 1418 and 1424 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media but do not include transitory propagating signals.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

While aspects have been particularly shown and described with references to example embodiments thereof, it will be understood that various changes in form and details may be made therein without departing from the scope and spirit identified by the appended claims.

What is claimed is:

1. A computer-implemented method of constructing a grammar comprising:
   training, by a computing device, a classifier using a confirmed annotation, the training comprising updating a corpus of the classifier with a feature extracted from the confirmed annotation, the feature comprising a hypernym of the confirmed annotation and at least one word of the confirmed annotation, the at least one word being adjacent to the hypernym in the confirmed annotation, and wherein extracting the feature comprises:
   obtaining a concatenated hypernym by concatenating at least two hypernyms of the confirmed annotation, obtaining a sequence comprising the concatenated hypernym, and extracting the hypernym from a substring of the confirmed annotation corresponding to the sequence;
   selecting, by a computing device, a digital text sample to annotate;
   transforming, by the computing device, the text sample into a set of annotation candidates;
   scoring, by the computing device, the set of annotation candidates using the classifier to obtain a set of annotation scores respectively for the set of annotation candidates;
   selecting, by the computing device, one of the annotation candidates in the set of annotation candidates as a suggested annotation for the text sample based on the set of annotation scores;
   deriving, by the computing device, an annotation-derived grammar rule based on the suggested annotation; and
   configuring, by the computing device, a digital grammar to include the annotation-derived grammar rule.

2. The method of claim 1 wherein generating the set of annotation candidates includes:
   locating a hypernym associated with an n-gram of the text sample;
   creating a new annotation candidate based on the text sample and the hypernym wherein the hypernym replaces the n-gram in the new annotation candidate; and
   including the new annotation candidate in the set of annotation candidates for the text sample.

3. The method of claim 2 wherein locating the hypernym associated with the n-gram includes:
   querying a collection of semantic relationship definitions with the n-gram;
   determining whether the collection of semantic relationship definitions defines a semantic relationship between the n-gram and a concept; and
   responsive to a determination that the collection of semantic relationship definitions does define a semantic relationship between the n-gram and a concept, selecting the concept as the hypernym associated with the n-gram.

4. The method of claim 3 wherein the collection of semantic relationship definitions is one of a digital concept mapping comprised of one or more key-value pairs, a digital ontology, and a linguistic resource that is accessible via a network.

5. The method of claim 3 wherein locating the hypernym associated with the n-gram further includes:
   determining that the collection of semantic relationship definitions does not define a semantic relationship between the n-gram and a concept;
   prompting a user for a manually-selected concept associated with the n-gram;
   receiving user input corresponding to the manually-selected concept; and
   selecting the manually-selected concept as the hypernym for the n-gram.

6. The method of claim 1 further comprising:
   deriving a classifier-derived grammar rule based on the corpus of the classifier; and
   configuring the grammar to include the classifier-derived grammar rule.

7. The method of claim 6 wherein: the classifier is a naive Bayes (NB) classifier.

8. The method of claim 7 wherein:
classifying the set of annotation candidates includes
selecting one of the annotation candidates,
extracting a plurality of hypernyms from the annotation candidate,
obtaining a set of concatenated hypernyms for the annotation candidate based on the plurality of hypernyms,
obtaining a set of sequences for the annotation candidate and a set of features based on the plurality of hypernyms and the set of concatenated hypernyms,
computing respective hypernym probabilities for each hypernym or concatenated hypernym associated with the annotation candidate wherein a hypernym probability is based on a feature probability computed by the NB classifier for one of the features corresponding to the hypernym or concatenated hypernym,
computing respective sequence probabilities for each sequence of the set of sequences wherein a sequence probability is a product of one or more hypernym probabilities computed for one or more hypernyms or concatenated hypernyms of the sequence, and
computing an annotation probability as the annotation score for the annotation candidate wherein the annotation probability is a sum of one or more sequence probabilities computed for the sequences of the set of sequences.

9. A system comprising:
at least one processor; and
memory storing computer-executable instructions that, when executed by the at least one processor, cause the system to:
train a classifier using a confirmed annotation, the training comprising updating a corpus of the classifier with a feature extracted from the confirmed annotation, the feature comprising a hypernym of the confirmed annotation and at least one word of the confirmed annotation, the at least one word being adjacent to the hypernym in the confirmed annotation, and wherein extracting the feature comprises:
obtaining a concatenated hypernym by concatenating at least two hypernym of the confirmed annotation, obtaining a sequence comprising the concatenated hypernym, and extracting the hypernym from a substring of the confirmed annotation corresponding to the sequence,
automatically annotate a text sample and obtain an annotation candidate of a set of annotation candidates for the text sample by replacing an n-gram of the text sample with a hypernym corresponding to the n-grams,
classify the set of annotation candidates for the text sample using the classifier, and
derive an annotation-derived grammar rule based on an annotation candidate selected as an annotation for the text sample, derive a classifier-derived grammar rule based on the corpus of the classifier, and configure a grammar to include the annotation-derived grammar rule and the classifier-derived grammar rule.

10. The system of claim 9 further comprising:
a display device;
one or more input devices; and
the instructions, when executed by the at least one processor, further cause the system to:
present at the display device one of the annotation candidates as a suggested annotation candidate for the text sample and prompt for confirmation of the suggested annotation candidate,
select the suggested annotation candidate as the annotation for the text sample responsive to receipt via the one or more input devices of user input indicating a confirmation of the suggested annotation candidate, and
responsive to receipt via the one or more input devices of user input indicating a rejection of the suggested annotation candidate, prompt for manual selection of one of the annotation candidates, receive user input via the one or more input devices corresponding to a manually-selected annotation candidate, and selecting the manually-selected annotation candidate as the annotation for the text sample.

11. The system of claim 9 wherein:
the instructions, when executed by the at least one processor, further cause the system to:
locate the hypernym corresponding to the n-gram by querying a collection of semantic relationship definitions for a concept associated with the n-gram and selecting the concept associated with the n-gram as the hypernym for the n-gram.

12. The system of claim 9 wherein:
the instructions, when executed by the at least one processor, further cause the system to:
classify the set of annotation candidates by determining a set of annotation scores respectively for the set of annotation candidates using the classifier; and
select an annotation candidate of the set of annotation candidates having the highest annotation score as a suggested annotation candidate for the text sample.

13. The system of claim 9 wherein: the classifier is a naive Bayes (NB) classifier.

14. The system of claim 13 wherein:
the instructions, when executed by the at least one processor, further cause the system to:
classify the set of annotation candidates by computing an annotation probability for one of the annotation candidates;
the annotation probability is based on a sum of one or more sequence probabilities computed for a set of sequences obtained based on the annotation candidate;
a sequence probability for one of the sequences is based on a product of one or more hypernym probabilities computed for one or more hypernyms or concatenated hypernyms of the sequence; and
a hypernym probability for one of the hypernyms or concatenated hypernyms is based on a feature probability computed by the NB classifier for one of the features corresponding to the hypernym or concatenated hypernym.

15. The system of claim 9 wherein:
the instructions, when executed by the at least one processor, further cause the system to:
sort rules of the grammar based on weighting values provided by the classifier.

* * * * *